United States Patent
Chu et al.

(10) Patent No.: US 9,749,975 B2
(45) Date of Patent: Aug. 29, 2017

(54) SYSTEMS AND METHODS FOR IMPLEMENTING PROTECTED ACCESS BASED ON A NULL DATA PACKET IN A WIRELESS NETWORK

(71) Applicant: Marvell World Trade LTD., St. Michael (BB)

(72) Inventors: Liwen Chu, San Ramon, CA (US); Lei Wang, San Diego, CA (US); Hongyuan Zhang, Fremont, CA (US); Hui-Ling Lou, Sunnyvale, CA (US); Yakun Sun, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 134 days.

(21) Appl. No.: 14/697,128

(22) Filed: Apr. 27, 2015

(65) Prior Publication Data
US 2015/0319782 A1 Nov. 5, 2015

Related U.S. Application Data

(60) Provisional application No. 61/986,650, filed on Apr. 30, 2014, provisional application No. 62/141,173, filed on Mar. 31, 2015.

(51) Int. Cl.
*H04Q 7/00* (2006.01)
*H04W 56/00* (2009.01)
(Continued)

(52) U.S. Cl.
CPC ........... *H04W 56/0015* (2013.01); *H04L 1/00* (2013.01); *H04W 56/001* (2013.01);
(Continued)

(58) Field of Classification Search
CPC ............. H04W 56/0015; H04W 74/08; H04W 56/001; H04W 88/08; H04W 74/00; H04W 28/18; H04L 1/00
(Continued)

(56) References Cited

U.S. PATENT DOCUMENTS 9,450,743 B1* 9/2016 Chu .................... H04L 69/22
2007/0153830 A1 7/2007 Xhafa et al.
(Continued)

FOREIGN PATENT DOCUMENTS

| EP | 2515452 A2 | 10/2012 |
|---|---|---|
| WO | WO-2008111496 A2 | 9/2008 |
| WO | WO-2012074316 A2 | 6/2012 |

OTHER PUBLICATIONS

IEEE P802.11ah™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications, Amendment 6: Sub 1 GHz License Exempt Operation, 802.11 Working Group of the LAN/MAN Standards Committee of the IEEE Computer Society, Oct. 2013, 394 pages.

(Continued)

*Primary Examiner* — Chuong T Ho

(57) ABSTRACT

An access point including a generation module, a transceiver, and an acknowledgment module. The generation module is configured to generate a synchronization signal. The transceiver is configured to (i) transmit the synchronization signal to a station, (ii) receive a medium access control protocol data unit based on the synchronization signal during a transmit opportunity period for the station. The acknowledgment module is configured to generate an acknowledgment signal based on the reception of the medium access control protocol data unit. The synchroni- (Continued)

zation signal or the acknowledgment signal includes a null data packet frame. The null data packet frame includes a legacy signal field. The legacy signal field comprises a length of a portion of the null data packet frame subsequent to the legacy signal field. The transceiver is configured to transmit the acknowledgment signal to the station.

31 Claims, 12 Drawing Sheets

(51) Int. Cl.
*H04W 74/08* (2009.01)
*H04L 1/00* (2006.01)
*H04W 28/18* (2009.01)
*H04W 74/00* (2009.01)
*H04W 88/08* (2009.01)

(52) U.S. Cl.
CPC ............ *H04W 74/08* (2013.01); *H04W 28/18* (2013.01); *H04W 74/00* (2013.01); *H04W 88/08* (2013.01)

(58) Field of Classification Search
USPC ........................................ 370/328, 329, 330
See application file for complete search history.

(56) References Cited

U.S. PATENT DOCUMENTS

| | | | | |
|---|---|---|---|---|
| 2010/0272003 | A1 | 10/2010 | Lee | |
| 2011/0128947 | A1* | 6/2011 | Liu | H04L 25/03343 370/338 |
| 2013/0028243 | A1* | 1/2013 | Wentink | H04L 1/0026 370/338 |
| 2013/0128798 | A1 | 5/2013 | Liu | |
| 2013/0286959 | A1 | 10/2013 | Lou et al. | |
| 2014/0003414 | A1 | 1/2014 | Choudhury et al. | |
| 2014/0056223 | A1* | 2/2014 | Quan | H04W 28/18 370/328 |
| 2014/0119268 | A1 | 5/2014 | Chu et al. | |

OTHER PUBLICATIONS

IEEE Std 802.11a-1999 (Supplement to IEEE Std 802.11-1999) Supplement to IEEE Standard for Information technology—Telecommunications and information exchange between systems—Local and metropolitan area networks—Specific requirements—Peal 1: Wireless LAN Medium Access Control (MAC) and Physical Layer (PHY) specifications: High-Speed Physical Layer in the 5 Ghz Band; LAN/MAN Standards Committee of the IEEE Computer Society; Sep. 16, 1999; 91 pages.

IEEE P802.11ac / D2.0; Draft STANDARD for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Jan. 2012; 359 pages.

IEEE Std 802.11af/01.05 Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation; The Institute of Electrical and Electronics Engineers, Inc., Nov. 2011; 123 pages.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 2009: 96 pages.

IEEE P802.11g/D8.2 DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; Apr. 2003; 69 pages.

Kiran Gunnam et al.; "Multi-Rate Layered Decoder Architecture for Block LDPC Codes of the IEEE 802.11n Wireless Standard"; 2007; pp. 1645-1648.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

802.16/2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std 802.20/2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29. 2008; 1032 pages.

"Specification of the Bluetooth System" Master Table of Contents & Compliance Requirements—Covered Core Package version: 4.0; Jun. 30, 2010; 2302 Pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa D6.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band; Sponsor IEEE 802.11 Committee of the IEEE Computer Society; Sep. 2011; 601 pages.

Rolf de Vegt; IEEE 802.11ax Selection Procedure (DRAFT); Jul. 2014; 117 pages.

IEEE P802.11n: TGn Sync Proposal Technical Specifications; Syed Aon Mujtaba; IEEE 802.11-04/0889r6; May 2005; 131 pages.

International Search Report and Written Opinion for PCT Application No. PCT/US2015/028013 mailed Jul. 20, 2015; 10 pages.

* cited by examiner

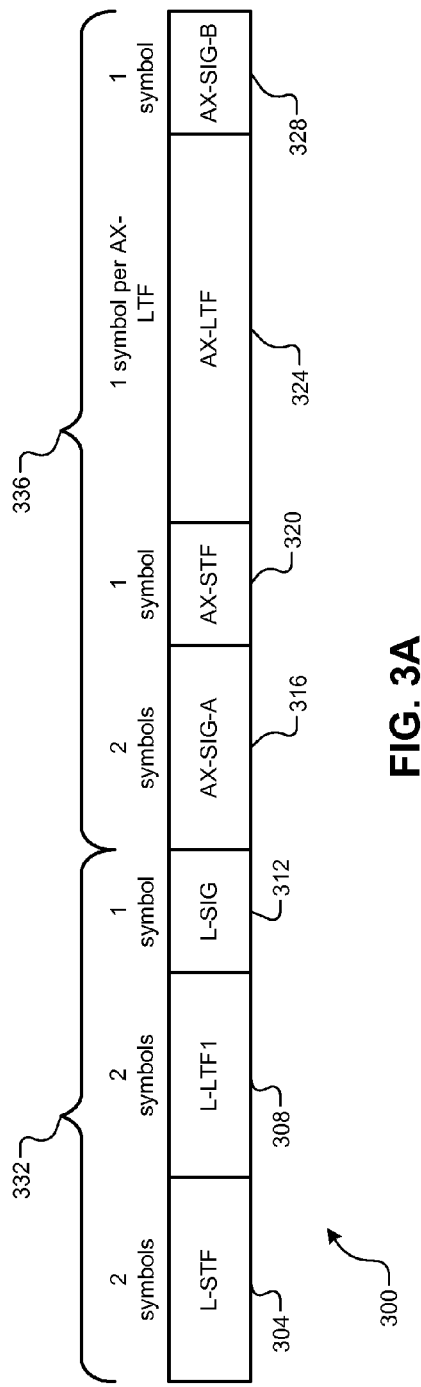
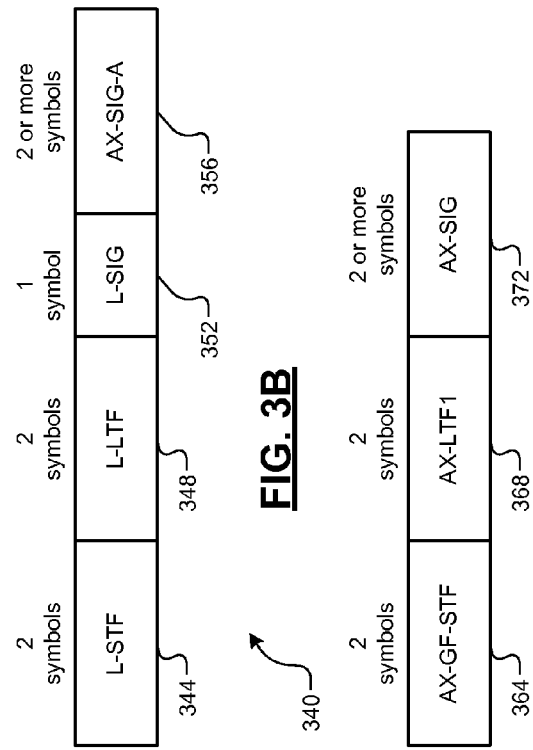
FIG. 3A
FIG. 3B
FIG. 3C

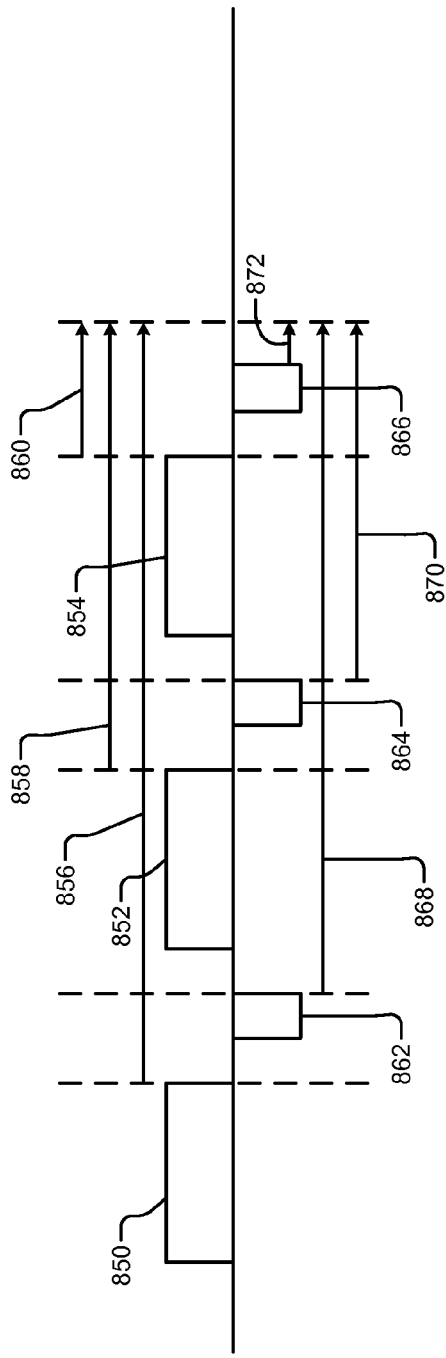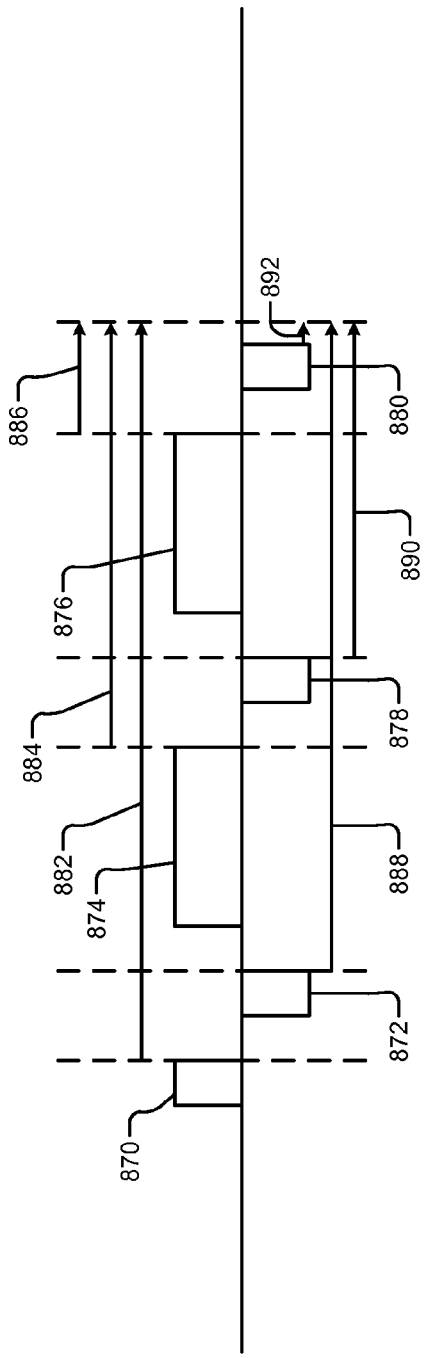

SYSTEMS AND METHODS FOR IMPLEMENTING PROTECTED ACCESS BASED ON A NULL DATA PACKET IN A WIRELESS NETWORK

CROSS-REFERENCE TO RELATED APPLICATIONS

This disclosure claims the benefit of U.S. Provisional Application No. 61/986,650, filed on Apr. 30, 2014 and U.S. Provisional Application No. 62/141,173, filed Mar. 31, 2015. This disclosure is related to U.S. patent application Ser. No. 14/620,344, filed on Feb. 12, 2015 and entitled "Systems and Methods for Implementing a Protected Access Window in a Wireless Network". The entire disclosures of the applications referenced above are incorporated herein by reference.

FIELD

The present disclosure relates to communication features in high efficiency WiFi wireless networks.

BACKGROUND

Wireless local area networks (WLANs) may include wireless devices such as an access point (AP) and one or more client stations. Various operating standards for WLANs include, but are not limited to, Institute for Electrical and Electronics Engineers (IEEE) 802.11a, 802.11ac, 802.11af, 802.11ah, 802.11b, 802.11g, and 802.11n.

The operating standards may implement (e.g., in a medium access control device) one or more features different from the other operating standards. For example, standards operating in a 2.4 GHz/5 GHz band may implement features including, but not limited to: using a network allocation vector (NAV) and/or clear channel assessment (CCA) during a backoff interval to determine whether the transmission medium is busy; enhanced distributed channel access (EDCA) and/or hybrid controlled channel access (HCCA); transmit opportunity (TXOP) protection; and/or a physical layer signature field (PHY SIG) that includes an extended interframe space (EIFS) time, a physical layer convergence procedure (PLCP) protocol data unit (PPDU) time, and a partial association identification (AID).

Standards operating in a sub-1 Ghz band may implement features including, but not limited to: using the NAV, a response indication deferral (RID), and/or the CCA during the backoff interval to determine whether the transmission medium is busy; a short frame header and/or a null data packet (NDP) control frame; EDCA, a target wakeup time (TWT), and/or a restricted access window (RAW); and/or TXOP protection and a response indication.

SUMMARY

In other features, an access point is provided and includes a generation module, a transceiver, and an acknowledgment module. The generation module is configured to generate a synchronization signal. The transceiver is configured to (i) transmit the synchronization signal to a station, (ii) receive a medium access control protocol data unit based on the synchronization signal during a transmit opportunity period for the station. The acknowledgment module is configured to generate an acknowledgment signal based on the reception of the medium access control protocol data unit. The synchronization signal or the acknowledgment signal includes a null data packet frame. The null data packet frame includes a legacy signal field. The legacy signal field comprises a length of a portion of the null data packet frame subsequent to the legacy signal field. The transceiver is configured to transmit the acknowledgment signal to the station.

In other features, a method of operating an access point is provided and includes: generating a synchronization signal; transmitting via a transceiver the synchronization signal to a station; receiving a medium access control protocol data unit based on the synchronization signal during a transmit opportunity period for the station; and generating an acknowledgment signal based on the reception of the medium access control protocol data unit. The synchronization signal or the acknowledgment signal includes a null data packet frame, and wherein the null data packet frame comprises a legacy signal field. The legacy signal field includes a length of a portion of the null data packet frame subsequent to the legacy signal field. The method further includes transmitting via the transceiver the acknowledgment signal to the station.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 3A shows an example high efficiency WLAN (HEW) mixed mode preamble/header.

FIG. 3B shows an example HEW mixed mode NDP MAC frame.

FIG. 3C shows an example HEW Greenfield mode header.

FIG. 9 shows a signal timing diagram illustrating transmit opportunity (TXOP) interference protection for transmitted medium access control (MAC) protocol data units (MPDUs) and NDP block acknowledgments (BAs).

FIG. 10 shows a signal timing diagram illustrating transmit opportunity (TXOP) interference protection for transmitted request to send (RTS) and clear to send (CTS) messages, MPDUs and NDP BAs.

In the drawings, reference numbers may be reused to identify similar and/or identical elements.

DESCRIPTION

Various IEEE 802.11 standards, such as IEEE 802.11n, 802.11ac, and 802.11ah implement a mixed mode preamble/header (e.g., referred to as a "long preamble" in IEEE 802.11ah). The mixed mode preamble includes a first portion and a second portion. The first portion may be referred to as an "omni portion" and may be used for omnidirectional transmission of a single stream. The second portion may be used for transmission of multiple streams. A mixed mode preamble may include the first portion to support multi-user multiple-input multiple-output (MU-MIMO) operation. For example only, the first portion includes a short training field (STF), a first long training field (LTF or LTF1), and a physical layer (PHY) signal field (SIG or SIG-A). The SIG-A field includes information about (e.g., how to process) the second portion corresponding to the mixed mode preamble, and may be modulated according to a binary phase-shift keying (BPSK) modulation scheme and/or a quadrature phase-shift keying (QPSK) modulation scheme. The second portion of the mixed mode preamble follows the SIG field. The first portion (e.g., IEEE 802.11ac omni portions) may include a legacy signal field (e.g., between LTF and SIG-A). The LTF may include double guard interval (DGI) and one or more long training sequences (LTS). Standards implementing a Greenfield (high throughput, or HT) mode may transmit a Greenfield mode preamble subsequent to the mixed mode preamble.

Forthcoming devices may implement an IEEE 802.11ax standard, which improves the efficiency of wireless local area networks (WLANs). A WLAN including devices implementing the IEEE 802.11ax standard may be referred to as a high efficiency WLAN (HEW). Systems and methods according to the principles of the present disclosure include devices that implement various features of a HEW.

Figure 1:
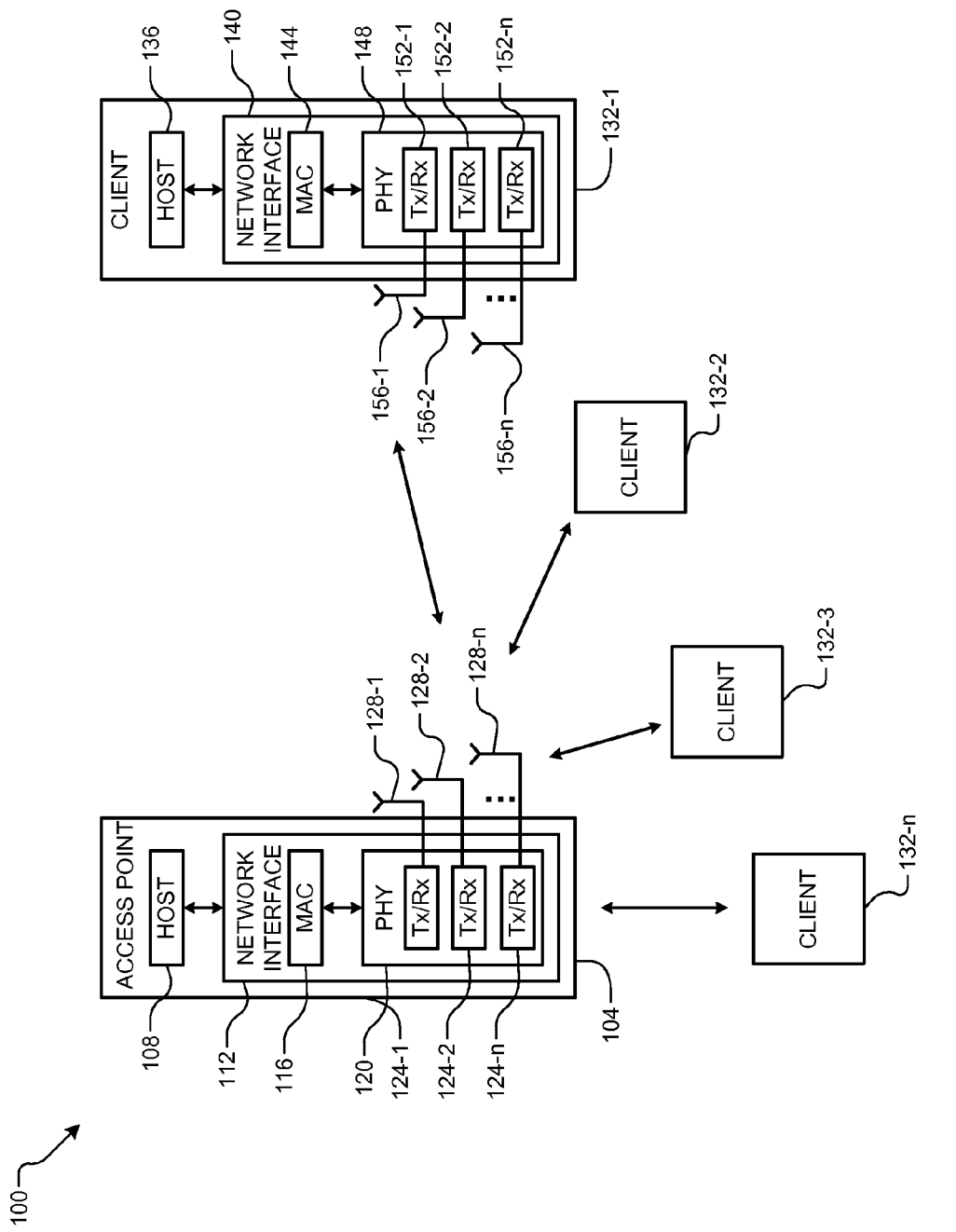
FIG. 1 shows an example wireless local area network in accordance with the present disclosure.

FIG. 1 shows an example WLAN 100 (e.g., a HEW) including one or more wireless communication devices configured to implement systems and methods according to an embodiment of the present disclosure. The WLAN 100 includes an access point (AP) 104 having a host processor (or module) 108 in communication with a network interface 112. The network interface 112 includes a medium access control (MAC) module 116 and a physical layer (PHY) module 120. The PHY module 120 includes transceivers 124-1, 124-2, ..., and 124-n, referred to collectively as transceivers 124. The transceivers 124 communicate with respective antennas 128-1, 128-2, ..., and 128-n, referred to collectively as antennas 128.

The AP 104 communicates with client stations 132-1, 132-2, 132-3, ..., and 132-n, referred to collectively as client stations 132. The client station 132-1 includes a host processor 136 in communication with a network interface 140. The network interface 140 includes a MAC module 144 and a PHY module 148. The PHY module 148 includes transceivers 152-1, 152-2, ..., and 152-n, referred to collectively as transceivers 152. The transceivers 152 communicate with respective antennas 156-1, 156-2, ..., and 156-n, referred to collectively as antennas 128. One or more of the client stations 132 may have a same or similar structure as the client station 132-1. For example only, each of the client stations 132 may have a same or different number of the transceivers 152 and the antennas 156.

The host processor 108, the MAC module 144, and/or the PHY module 120 of the AP 104 may be configured to generate data packets including a HEW (e.g., IEEE 802.11ax) preamble, a Greenfield (high throughput) mode preamble, and/or a HEW NDP MAC frame according to the principles of the present disclosure. The transceivers 124 are configured to transmit the data packets via the respective antennas 128. Conversely, respective receiving devices (i.e., the client stations 132) are configured to selectively process the data packets received from the AP 104 via antennas 156.

Figure 2A:
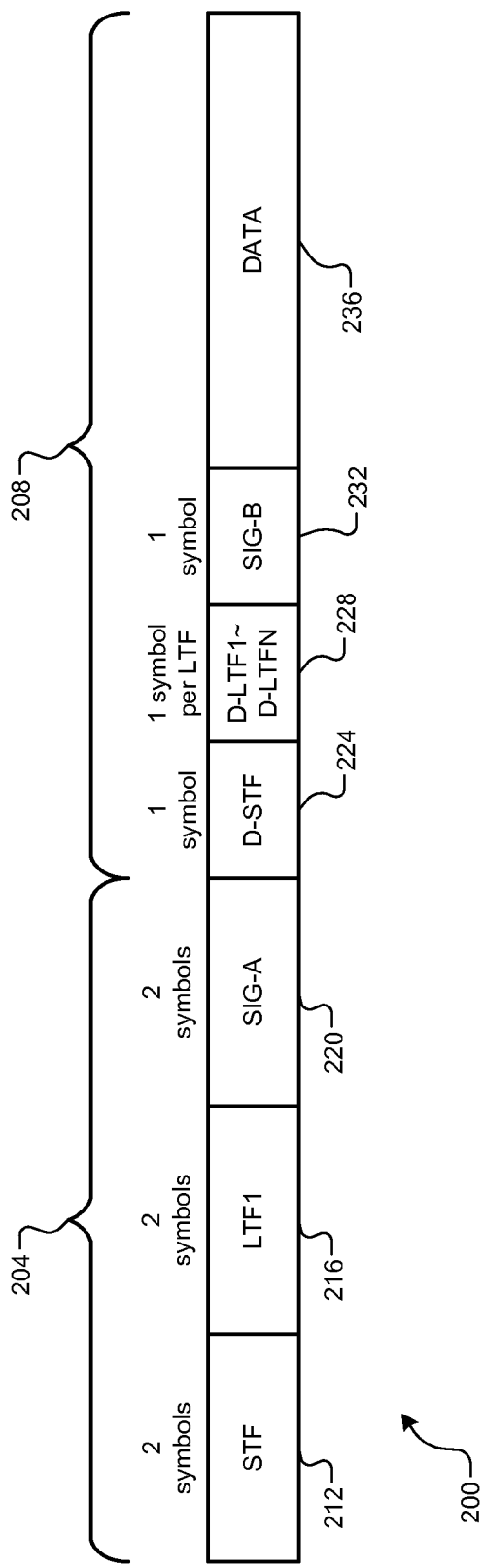
FIG. 2A shows an example mixed mode preamble.

FIG. 2A shows an example mixed mode preamble/header 200 generated and transmitted by a pre-802.11ax network device (e.g., an IEEE 802.11ac network device, an IEEE 802.11ah network device, etc.). The header 200 includes first portion 204 and a second portion 208. The first portion 204 includes an STF 212, an LTF1 216, and a PHY SIG-A 220. An optional L-SIG may be included in the first portion 204 between the LTF1 216 and the SIG-A 220. The second portion 208 includes a short training field (D-STF) 224, D-LTF1 ... D-LTFN 228, a PHY SIG-B 232, and data 236.

Figure 2B:
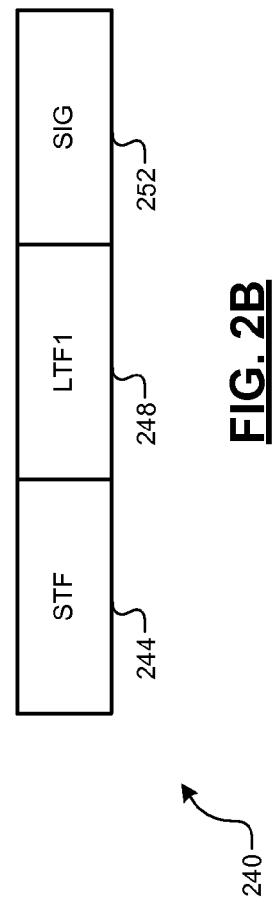
FIG. 2B shows an example null data packet (NDP) medium access control (MAC) frame.

FIG. 2B shows an example a NDP MAC frame 240 generated and transmitted by a pre-IEEE 802.11ax network device. An NDP MAC frame is a control frame or other type of frame and refers to a PPDU that does not include a MPDU. An NDP MAC frame is used for narrow bandwidth transmission (e.g., 1-2 mega-hertz (MHz) transmissions). An NDP MAC frame may include compressed MAC information, as further described below. The NDP MAC frame does not include OFDM symbols subsequent to a PHY header. The PHY header may include STF, LTF and SIG fields. The NDP MAC frame 240 as shown includes an STF 244, an LTF1 248, and a SIG 252. The SIG 252 includes a bit that indicates whether the SIG 252 corresponds to a normal PPDU frame (i.e. PPDU frame that includes a MPDU) or an NDP MAC frame (i.e., the NDP MAC frame 240). The SIG 252 may also include MAC information. Due to limited available bits in the SIG 252, the MAC information may be compressed. For example, the SIG 252 may not include a MAC address for identifying transmitting device. Instead, a partial association identification (AID) or acknowledgement frame identification may be used to identify the transmitting and/or receiving device for the NDP MAC frame 240. The NDP MAC frame 240 may also not include a response indication deferral (RID). A block acknowledgment (BA) frame corresponding to the NDP MAC frame 240 may not include a duration field.

Typically, a network device such as an IEEE 802.11ah network device is configured to decode an NDP acknowledgement (ACK) frame, an NDP BA frame, and an NDP clear to send (CTS) frame. One or more of these frames (and the included duration field and/or RID) may be used to implement TXOP protection.

FIG. 3A shows an example HEW (e.g., IEEE 802.11ax) mixed mode preamble/header (e.g., a PHY header) 300 generated by the AP 104 according to the principles of the present disclosure. The header 300 includes a legacy STF, or L-STF (e.g., two symbols, or 4 μs per symbol for 8 μs) 304, a legacy LTF, or L-LTF (e.g., two symbols) 308, a legacy SIG, or L-SIG (e.g., one symbol) 312, an IEEE 802.11ax signal field, or AX-SIG-A (e.g., two symbols) 316, an IEEE 802.11ax STF, or AX-STF (e.g., one symbol) 320, one or more IEEE 802.11ax LTFs, or AX-LTFs (e.g., one symbol per AX-LTF) 324, and an IEEE 802.11ax SIG-B, or AX-SIG-B (e.g., one symbol) 328. Accordingly, the header 300 includes a legacy portion 332 and an AX portion 336. In this manner, network devices that implement the IEEE 802.11ax protocol as well as network devices that implement certain pre-IEEE 802.11ax protocols (e.g., IEEE 802.11ah) will be supported.

FIG. 3B shows an example HEW (e.g., IEEE 802.11ax) mixed mode NDP MAC frame 340 according to the principles of the present disclosure. The NDP MAC frame 340 includes an L-STF (e.g., two symbols) 344, an L-LTF (e.g., two symbols) 348, an L-SIG (e.g., one symbol) 352, and an IEEE 802.11ax SIG-A, or AX-SIG-A (e.g., two or more symbols) 356. In other words, the AX-SIG-A 356 may have a variable length. Accordingly, the NDP MAC frame 340 includes the L-SIG 352 to indicate an end of the NDP MAC frame 340 to a receiving device (e.g., a pre-IEEE 802.11ax network device). The NDP MAC frame 340 does not include, for example, an AX-STF, an AX-LTF, and/or an AX-SIG-B. The L-SIG 352 includes a bit that indicates whether the L-SIG 352 corresponds to a normal PPDU frame or an NDP MAC frame. In order to accommodate different MAC contents of control frames in the NDP MAC frame, an indicator of the variable length of the AX-SIG-A 356 is included in the NDP MAC frame 340. In another embodiment, the NDP MAC frame 340 includes an AX-SIG-A 356 of a fixed length, and further includes an AX-SIG-B following the AX-SIG-A. The AX-SIG-B has a variable number of OFDMA symbols.

FIG. 3C shows an example HEW (e.g., IEEE 802.11ax) Greenfield mode header 360 according to the principles of the present disclosure. The header 360 includes an IEEE 802.11ax Greenfield mode STF, or AX-GF-STF (e.g., two symbols) 364, an IEEE 802.11ax LTF1, or AX-LTF1 (e.g., two symbols) 368, and an IEEE 802.11ax SIG, or AX-SIG (e.g. two or more symbols) 372. In order to accommodate different MAC contents of control frames in the NDP MAC frame, an indicator of the variable length of the AX-SIG 372 is included in the NDP MAC frame 360. In another embodiment, the NDP MAC frame 360 includes both an AX-SIG-A and an AX-SIG-B, in which the AX-SIG-A has a fixed length, and the AX-SIG-B has a variable number of OFDMA symbols following the AX-SIG-A.

With L-SIG indicating an end of a NDP MAC frame, a NDP length field may not be included in the NDP MAC frame 340. Using the information in the L-SIG 352, recipients of the NDP MAC frame 340 can determine the end of the NDP MAC frame 340 and therefore receive the NDP MAC frame 340 correctly. The recipients of the NDP MAC frame 340 can then decode the NDP MAC frame 340. Conversely, for the Greenfield mode NDP MAC frame 376, a length field is included to define the length of the Greenfield mode NDP MAC frame 376.

Legacy stations are not able to determine the length of the subsequent AX PPDUs. In order to protect subsequent AX PPDUs, the L-SIG 352 in the NDP MAC frame 340 indicates the time of the remaining TXOP. An additional field in the AX-SIG-A 356 or the AX-SIG-B indicates the length of the NDP MAC frame 340. The L-SIG 312 in the mixed mode header 300 can also indicate the time of the remaining TXOP. In this manner, pre-IEEE 802.11ax network devices (e.g., IEEE 802.11a, 802.11b, 802.11g, 802.11n, 802.11ac, etc.) operating in a wireless network with one or more IEEE 802.11ax network devices use the L-SIG 312 in the mixed mode header 300 and the L-SIG 352 in the NDP MAC frame 340 to determine the respective durations of the remaining TXOP. For example, a receiving device that is the recipient of the NDP MAC frame 340 assumes the PPDU ends subsequent to the remaining time of the TXOP as indicated in the L-SIG 352. Prior to the end of the TXOP, the receiving devices operate as if the medium is busy. Consequently, a TXOP interval can be protected.

For example, legacy devices and HEW devices operate as if the medium is busy until the end of remaining TXOP indicated by a NDP synchronization (SYNC) frame. This is an indication to the stations of when a corresponding transmission medium is to be busy. The stations defer from transmitting on the same medium during the periods that the medium is busy. As used herein, the term "transmission medium" may refer to a channel or one or more frequencies.

Enhanced distribution channel access (EDCA) provides contention-free access to a channel for a TXOP period. The TXOP corresponds to a bounded time interval during which a station can send one or more frames without contention. The station has the right to initiate frame exchange sequences onto the wireless medium in a respective TXOP. The TXOP is either obtained by the station after successfully contending for the channel or assigned by, for example, a hybrid coordinator. Example implementations of a TXOP are described in U.S. Patent Publication No. 2014/0119268, the entire disclosure of which is incorporated herein by reference. Accordingly, a receiving device according to the principles of the present disclosure can readily determine durations of respective frames using the L-SIGs 312 and 352.

In other features, contention between network devices (e.g., a device implementing a 1 MHz PHY and a device implementing a 2 MHz PHY) may be resolved by time-multiplexing the wireless channel. A restricted access window (RAW) can be used as described in U.S. Patent Publication No. 2013/0128798, the entire disclosure of which is incorporated herein by reference.

For example, subsequent to waking up for a beacon, each network device remains awake for a period of time called an announcement traffic indication message (ATIM) window. In an ad hoc mode, during the ATIM window, each network device (i.e., station) determines whether buffered frames can be sent to other network devices and whether to expect to receive frames buffered at other stations. The concept of an ATIM window in the ad hoc mode can be adapted to infrastructure mode. In an infrastructure basic service set (BSS), beacons are periodically transmitted by an AP based on a target beacon transmission time (TBTT). Power-saving stations associated with the BSS are expected to wake up to receive each beacon that includes a delivery traffic indication map (DTIM) or traffic indication map (TIM). In the DTIM or TIM, the AP can announce a window of time, following the DTIM, during which transmissions can be prearranged. Power-saving stations may return to a doze state if no relevant transmissions are arranged during the window. This window corresponds to the RAW. The RAW is divided into time slots and each station is assigned a different time slot within the RAW.

Figure 4A:
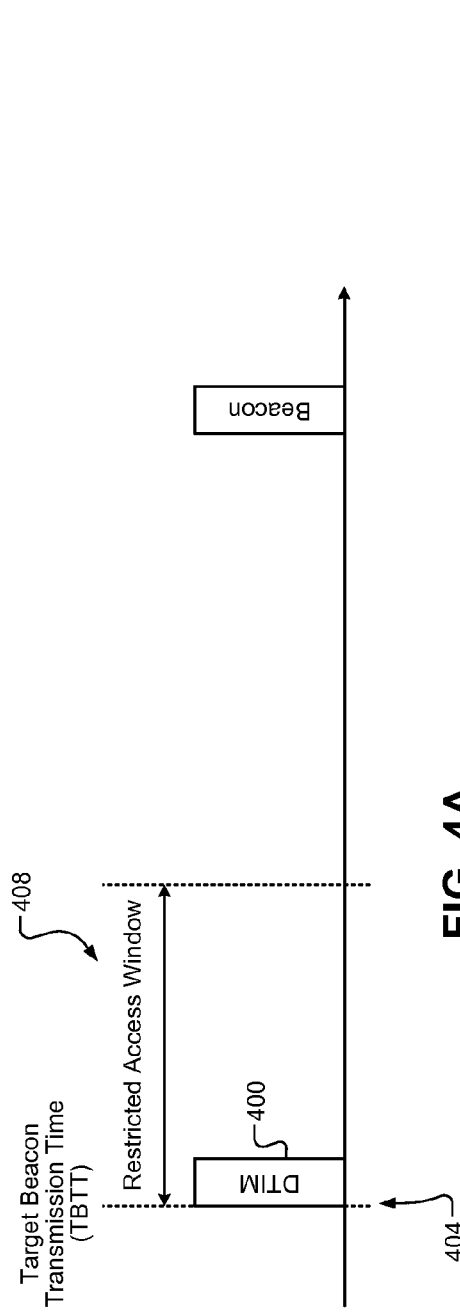
FIG. 4A shows a delivery traffic indication map being transmitted by an AP at approximately a target beacon transmission time.
Figure 4B:
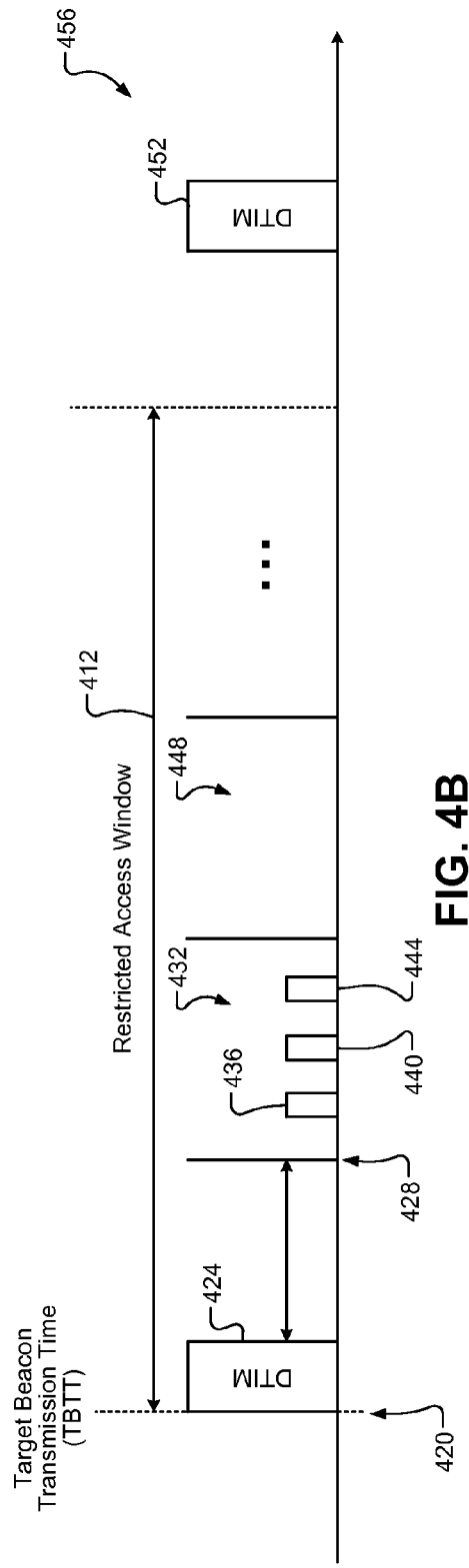
FIG. 4B shows an example restricted access window including multiple time slots.

FIGS. 4A and 4B show example implementations of a RAW in a pre-IEEE 802.11ax wireless network. For example, FIG. 4A shows a delivery traffic indication map (DTIM) or TIM 400 being transmitted by an AP at approximately a target beacon transmission time (TBTT) 404. The DTIM or TIM 400 may be included in a beacon frame. The DTIM or TIM 400 announces that a restricted access window (RAW) 408 is to be created, and may specify the duration of the RAW 408. In addition to informing stations familiar with RAWs of a duration of the RAW 408, the duration may allow stations unfamiliar with RAWs to set their network allocation vector (NAV) based on the specified duration. By setting the NAV, these stations do not interfere with transmissions during the RAW 408. Frames transmitted during the RAW 408 may inherit the remaining duration of the RAW 408, and may announce the duration as being allocated to the one or more stations transmitting the frames.

The DTIM or TIM 400 may only specify the duration or ending time of the RAW 408, and therefore the beginning of the RAW 408 could be considered to be the beginning of the DTIM or TIM 400 frame or the TBTT 404. For example only, according to IEEE 802.11-2012, the DTIM or TIM 400 should be sent as soon as possible after TBTT 404 subject to channel access rules. Regardless of when the RAW 408 in fact begins, the RAW 408 does not effectively begin to function until after the end of the DTIM or TIM 400.

FIG. 4B shows an example RAW 412 including time slots 416. Each station wakes up at a TBTT 420 to receive a DTIM or TIM 424, which indicates the slot duration for the RAW 412. The DTIM or TIM 424 may be included in a beacon frame. For example, slot durations for respective RAWs may be different. Each station also determines its time slot based on the DTIM or TIM 424, which may be assigned by the AP.

An example station begins to access the channel at a time slot boundary 428 corresponding to a time slot 432. The station sends a power-saving poll (PS-Poll) frame 436, and the AP responds to the station with buffered data 440. The station responds to the data 440 with an acknowledgment frame (ACK) 444. Another station then wakes up to access the channel in a subsequent time slot 448. Another DTIM 452 (e.g., in another beacon frame) indicates the beginning of a subsequent RAW 456.

In an IEEE 802.11ax network, the RAW is used to transmit an OFDMA PPDU. The RAW is not separated into slots. The AP controls the medium access in a RAW. When there are buffered frames for stations in the AP, the AP sends downlink OFDMA PPDUs to associated stations. When there are buffered frames in the stations for transmission to the AP, the AP sends a trigger frame to trigger a group of stations to transmit the frames to the AP in uplink OFDMA PPDUS.

Figure 5:
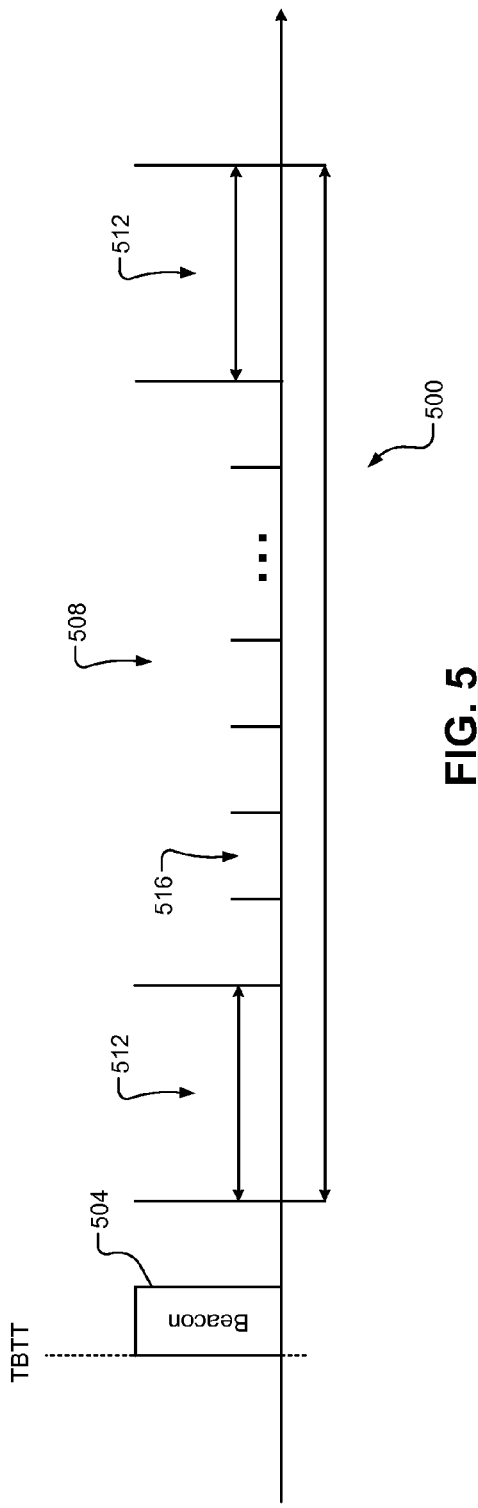
FIG. 5 shows an example protected access window implemented by devices operating in an IEEE 802.11ax network.

FIG. 5 illustrates an example protected access window (PAW) 500 implemented by network devices operating in an IEEE 802.11ax network according to the principles of the present disclosure. Stations operating in the IEEE 802.11ax network are not required to support slot-based access (i.e., the slot-based access provided by the RAWs described in FIGS. 4A and 4B). Instead, slot allocation and access may be optional.

For example, a beacon frame 504 may define the PAW 500 (e.g., according to a DTIM or TIM included in the beacon frame 504). The beacon frame 504 may indicate an AID set that may access the channel during the PAW 500, a start time of the PAW 500, the duration of the PAW 500, and an optional period of the PAW 500 that corresponds to slot-based access. In other words, only a portion of the PAW 500 may be divided into time slots while another portion of the PAW 500 may be accessed according to another channel access protocol. In this manner, a station that does not support slot-based access protocols can nonetheless access the channel during the PAW 500. The AP may selectively include or not include a slot-based portion in the PAW 500 (e.g., based on whether stations communicating with the AP support slot-based access) and/or assign time slots to respective stations in the slot-based portion of the PAW 500.

For example, the PAW 500 may include a first portion 508 and one or more second portions 512. The PAW may also only include the first portion 508 or second portion 512. The first portion 508 corresponds to a slot-based portion (i.e., a portion of the PAW 500 that is divided into slots 516 that are assigned to respective stations). The second portions 512 correspond to non-slot-based portions (i.e., portions of the PAW 500 that are not divided into slots). Stations may access the channel during the second portions 512 of the PAW using another contention or non-contention based method, such as triggered by the AP for uplink OFDMA transmission. Accordingly, even stations that do not support slot-based access may still access the channel during the PAW 500, and therefore any station in the AID set indicated by the beacon frame 504 is permitted to access the channel during the PAW 500. Stations in the AID set may set their respective NAVs according to the duration of the PAW 500 indicated in the beacon frame 504.

In another implementation, the AP may transmit a frame at the beginning of the PAW 500 that includes a duration field indicating the duration of the PAW 500. Stations in the AID set associated with the PAW 500 are permitted to access the channel (e.g., according to EDCA) during the PAW 500 subsequent to receiving this frame. Legacy stations (i.e. pre-IEEE 802.11ax stations) in the AID set and/or IEEE 802.11ax stations not in the AID set their respective NAVs to the duration of the PAW 500 according to the duration field. Accordingly, legacy stations and stations outside of the AID set can abstain from accessing the channel during the PAW 500.

Figure 6:
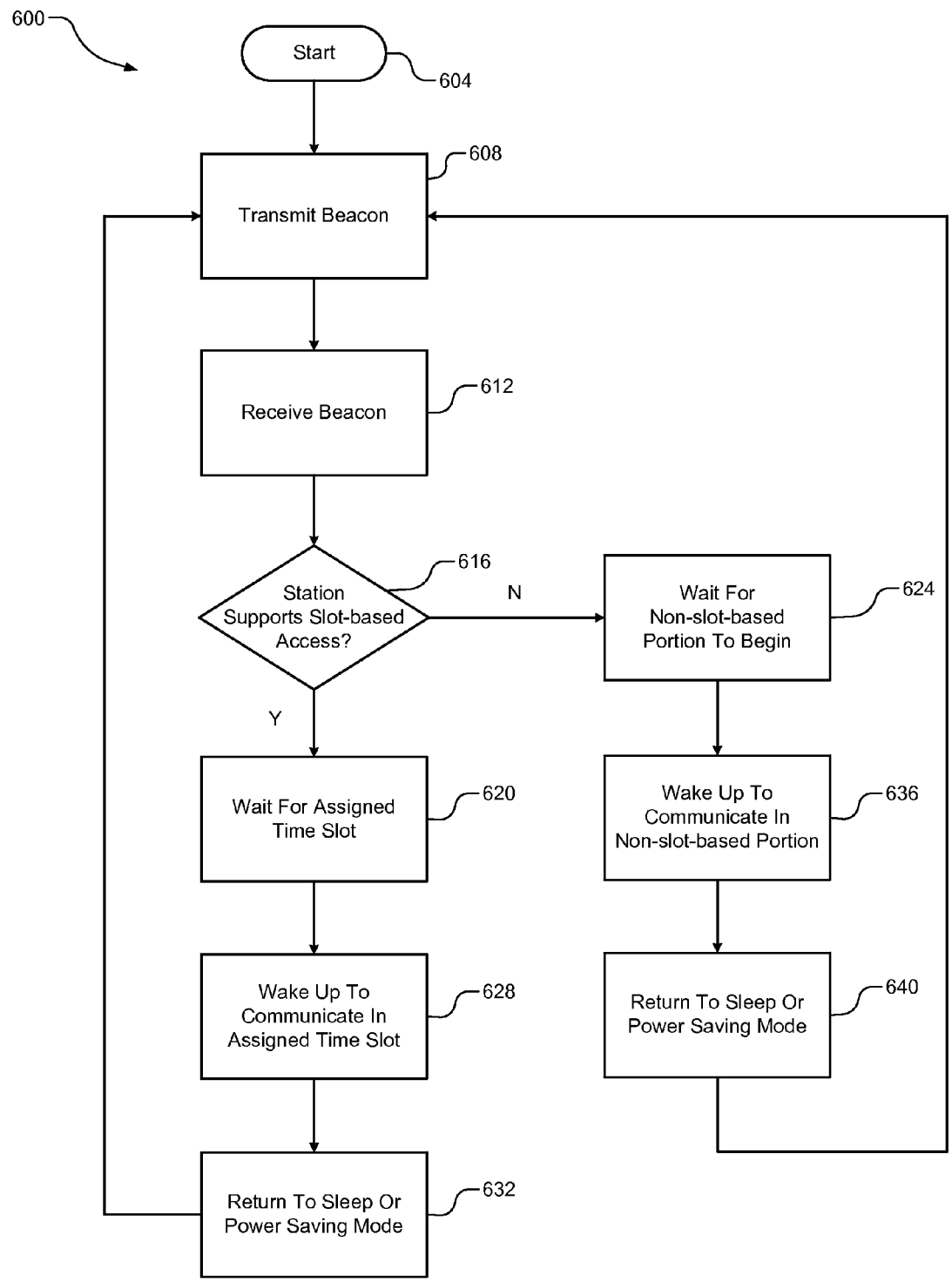
FIG. 6 shows an example method for implementing a protected access window.

FIG. 6 shows an example method 600 for implementing a protected access window (PAW) according to the principles of the present disclosure. The method 600 begins at 604. At 608, the method 600 transmits a beacon at a TBTT. For example, an AP transmits the beacon to one or more stations operating in a wireless network. The beacon may include information (e.g., in a DTIM or other IEs) about a PAW. The information may include, but is not limited to, duration of the PAW and/or time slots in the PAW assigned to respective stations. At 612, a station receives the beacon. At 616, the method 600 determines whether the station supports slot-based access. If true, the method 600 continues to 620. If false, the method 600 continues to 624.

At 620, station waits until a time slot in the PAW as assigned by the AP in the beacon. At 628, the station wakes up to communicate with the AP in the assigned time slot. At 632, the station returns to a sleep or other power saving mode until a next TBTT and the method 600 continues to 608.

At 624, the station waits until a non-slot-based portion of the PAW begins. At 636, the method 600 wakes up and attempts to communicate with the AP in the non-slot-based portion of the PAW. For example, the station attempts to communicate according to an EDCA protocol or after receiving trigger frame to trigger uplink OFDMA PPDU transmission. At 640, the station returns to a sleep or other power saving mode until a next TBTT and the method 600 continues to 608.

In various implementations, a target wakeup time (TWT) may be used to decrease collisions among stations. For example, the TWT may decrease collisions among TWT stations (i.e., stations that do not need to receive a beacon frame at a TBTT) and non-TWT stations. In a wireless network implementing a TWT protocol, stations may negotiate a TWT service period (SP). In the TWT SP, normal access rules for channel may be applied (e.g., a desired contention or non-contention based access protocol). A station wakes up at a respective assigned TWT of the station to communicate with the AP without needing to decode a traffic indication message (TIM) transmitted by the AP. Accordingly, the station can conserve power. For example, the AP may request a specific TWT for the station. If the station approves the TWT, the AP may remain in a sleep or other power saving mode until the TWT (e.g., until a timing synchronization function timer matches the TWT). TWT SP can also be used for OFDMA transmission where a group of STAs wake up at the assigned TWT.

The systems and methods according to the principles of the present disclosure may implement a TWT in an HEW (e.g., IEEE 802.11ax) wireless network in conjunction with a RAW (and/or a PAW as described above). For example, if only a RAW (or PAW) is used, a required duration of a time slot assigned to a respective station may be unknown to the AP. Conversely, in an HCCA contention-free procedure that provides traffic negotiation between the AP and respective stations, estimated slot times required by each station may be known to the AP. However, with HCCA, a station does not know when the AP is to schedule the uplink transmission from the station to the AP or downlink transmission to the station. Accordingly, the station needs to always be in an active state. A HEW network according to the principles of the present disclosure implements both HCCA and a RAW (or PAW) using a TWT.

For example, the AP may first determine the required slot times required by respective stations during the HCCA procedure. More specifically, the AP implements the HCCA procedure to conduct traffic negotiation with one or more stations to determine the slot times required by respective stations (e.g., for uplink traffic from each station to the AP). Subsequent to the negotiation conducted by the HCCA procedure, a RAW may begin. For example, the AP may transmit a beacon frame including time slot assignments to initiate a RAW or PAW as described in FIGS. 5 and 6. The time slot assignments may be based on information obtained during the HCCA procedure. The RAW may be included within an HCCA scheduled service period. A start time of the scheduled service period corresponds to a TWT.

Figure 7:
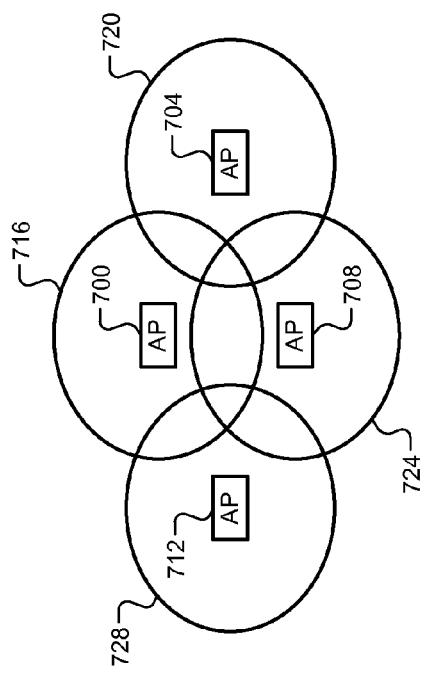
FIG. 7 shows neighboring APs having respective basic service sets (BSS).

FIG. 7 shows neighboring (i.e., adjacent or overlapping) APs 700, 704, 708, and 712 having respective basic service sets (BSS) 716, 720, 724, and 728. If respective scheduled service periods (SPs) of neighboring APs overlap, data transmission on a same channel may encounter interference from other stations/APs. Accordingly, an AP may transmit a beacon frame indicating, for example, a start time, duration, and/or a period of the AP's scheduled SP and SPs that are not usable by the AP. For example, SPs that are not usable by the AP 700 may include SPs already selected by the APs 704, 708, and 712. Conversely, the AP 712 may still select an SP already selected by the AP 704 since the BSS 728 and the BSS 720 do not overlap.

APs operating in an HEW network according to the principles of the present disclosure implement an SP selection algorithm that selects an SP based on whether a neighboring AP can or cannot use the SP. For example, if a first AP (e.g., the AP 700) is not able to use a first SP (e.g., the first SP has already been selected by the AP 712) and a second AP (e.g., the AP 704) is able to use the first SP (e.g., the AP 708 has not selected the first SP and the AP 704 and the AP 712 do not have overlapping BSSs), then the AP 704 selects the first SP. The APs may select respective BSS operating channels according to a similar procedure. For example, if a first AP (e.g., the AP 700) is not able to use a first channel (e.g., the first channel has already been selected by the AP 712) and a second AP (e.g., the AP 704) is able to use the first channel (e.g., the AP 708 has not selected the first channel and the AP 704 and the AP 712 do not have overlapping BSSs), then the AP 704 selects the first channel.

Figure 8:
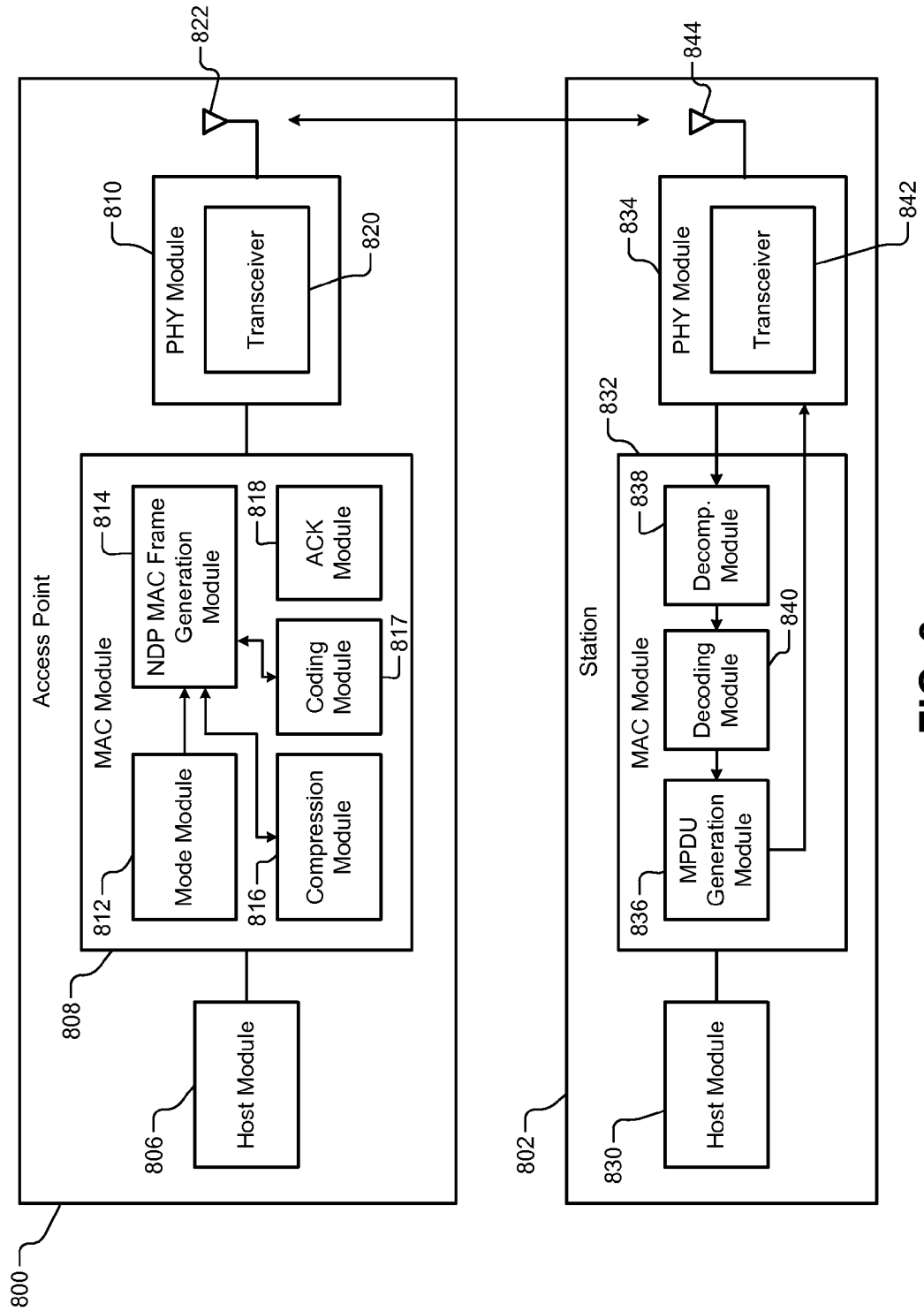
FIG. 8 shows an access point and a station in accordance with the present disclosure.

FIG. 8 shows an access point 800 and a station 802. The access point 800 may replace the access point 104 of FIG. 1. The station 802 may replace any one of the stations 132 of FIG. 1. The access point 800 includes a host module 806, a MAC module 808 and a PHY module 810. The MAC module may include a mode module 812, a NDP frame generation module 814, a compression module 816, a coding module 817 and/or an ACK module 818. The PHY module 810 includes a transceiver 820 that communicates with stations via an antenna 822. The host module 806 may provide data to the MAC module 808 for transmission to the station 802 and/or receive data from the MAC module 808. The NDP frame generation module 814 may generate NDP MAC frames based on an operating mode. The modes include a Greenfield mode and a mixed mode, which may be determined by the mode module 812. The compression module 816 may compress MAC information included in the NDP MAC frames. A portion of the MAC information may be included in AX-SIG-A and/or AX-SIG-B portions of the NDP MAC frames. The MAC information that may be included in the NDP MAC frames is further described below. The coding module 817 performs modulation and coding of NDP MAC frames and/or portions of the NDP MAC frames. The ACK module 818 may generate NDP acknowledgments (ACKs) and/or NDP BAs in response to received MPDUs and/or aggregated MPDUs (A-MPDUs) received from the station 802. The NDP MAC frames, the ACKs, and the NDP BAs may be transmitted to the station 802 via the transceiver 820.

The station 802 includes a host module 830, a MAC module 832 and a PHY module 834. The MAC module 832 includes a MPDU generation module 836, a decompression module 838 and a decoding module 840. The MPDU generation module 836 may generate MPDUs, A-MPDUs and/or PPDUs based on data received from the host module 830. The PPDUs may include the MPDUs and/or A-MPDUs. The MPDUs, A-MPDUs and/or PPDUs may be transmitted to the access point 800 via a transceiver 842. The decompression module 838 may decompress the compressed AX-SIG-As and/or the AX-SIG-Bs received from the access point 800. The decoding module 840 demodulates and/or decodes received NDP MAC frames and/or portions of the NDP MAC frames. The PHY module 834 includes the transceiver 842 that communicates with the access point 800 via an antenna 844.

FIG. 9 shows a signal timing diagram illustrating transmit opportunity (TXOP) interference protection for transmitted MPDUs (or A-MPDUs) and NDP BAs. A series of transmitted MPDUs 850, 852, 854 are shown. The MPDUs 850, 852, 854 may be, for example, transmitted by one or more stations to an access point. Arrows 856, 858, 860 are provided and refer to remaining portions (or durations) of a TXOP period. The TXOP period refers to a period in which the one or more stations are permitted to transmit MPDUs to the access point. The durations may be indicated in, for example, headers and/or L-SIGs of the MPDUs and indicate remaining time from an end of the corresponding MPDU to the end of the TXOP. During these durations, other stations (legacy and/or non-legacy stations) may not be permitted to transmit and/or may detect the headers and/or L-SIGs and refrain from transmitting during the durations to prevent interference with the MPDUs and/or NDP BAs. A series of NDP BAs 862, 864, 866 are also shown. The NDP BAs 862, 864, 866 may be transmitted by the access point to the one or more stations in response to respectively the MPDUs 850, 852, 854. Arrows 868, 870, 872 are provided and refer to remaining portions (or durations) of a TXOP period respectively from ends of the NDP BAs. Headers and/or L-SIGs of the NDP BAs 862, 864, 866 may respectively indicate the durations from the ends of the NDP BAs to the end of the TXOP.

During a TXOP, a duration value corresponding to a last NDP MAC frame (e.g., a last NDP MAC frame transmitted prior to transmission of the MPDUs 850, 852, 854) is not less than a length of an AX-SIG that follows an L-SIG in the corresponding PPDU. A PPDU may include legacy and high-throughput (or non-legacy) headers and a MPDU (or A-MPDU). The MPDU (or A-MPDU) may have a corresponding MAC header, MAC payload (or data), and a frame check sequence. The PPDU may include one or more of the MPDUs 850, 852, 854.

FIG. 10 shows a signal timing diagram illustrating TXOP interference protection for transmitted RTS and CTS messages, MPDUs and NDP BAs. A RTS message 870, a NDP CTS message 872, following A-MPDUs 874, 876, and corresponding NDP BAs 878, 880 are shown. The RTS message 870 may be transmitted by an access point to a station. The NDP CTS message 872 may be transmitted from the station in response to the RTS message 870. The A-MPDUs 874, 876 may be transmitted in response to the NDP CTS message 872. Remaining duration of the TXOP (shown by arrows 882, 884, 886, 888, 890, 892) may be indicated in headers and/or L-SIGs of the messages 870, 872, A-MPDUs 874, 876 and/or NDP BAs 878, 880. During these durations of the TXOPs, other stations (legacy and/or non-legacy stations) may not be permitted to transmit and/or may detect the headers and/or L-SIGs and refrain from transmitting during the durations of the TXOPs to prevent interference.

Figure 11:
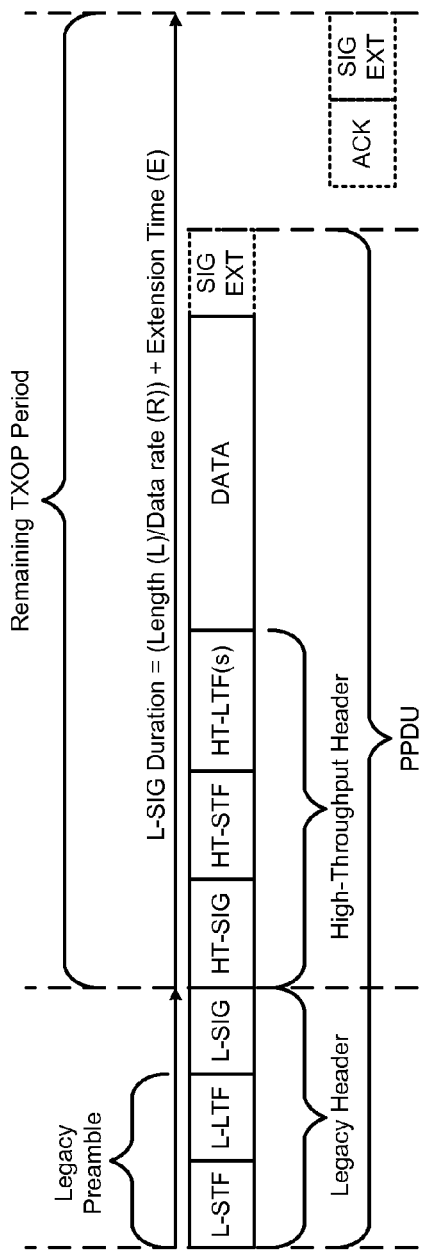
FIG. 11 shows a signal timing diagram illustrating transmit opportunity (TXOP) interference protection for a physical layer convergence protocol (PLCP) protocol data unit (PPDU).

FIG. 11 shows a signal timing diagram illustrating TXOP interference protection for a PPDU. The PPDU is shown as having a legacy header, a high-throughput (HT) header and data. The data may include one or more MPDUs and/or A-MPDUs. Each of the MPDUs and/or A-MPDUs may include a MAC header, a MAC payload (or data) and a frame check sequence. The PPDU may include a signal extension field. The PPDU may be transmitted from a station. An access point may transmit an ACK in response to receiving the PPDU from the station. The ACK may have a signal extension field.

The legacy header includes (i) a legacy preamble with an L-STF and an L-LTF, and (ii) an L-SIG. The HT header includes a HT-SIG, HT-STF, and one or more HT-LTFs. The L-SIG field may indicate a length L of the remaining portion of the TXOP and/or a remaining duration of a TXOP period (or remaining TXOP period). The remaining duration may be equal to a sum of (i) the length L of the remaining portion of the TXOP divided by a data transmission rate R, and (ii) a length of the signal extension field of the PPDU. The length of the remaining duration of the TXOP refers to a period from an end of the L-SIG to the end of the TXOP, which may be indicated as, for example, a number of OFDM symbols. One or more of the MAC headers may include the remaining duration.

A legacy device or other device detecting L-SIG transmitted by the station may not transmit during the remaining TXOP period or a portion thereof to avoid interference with the transmission of the PPDU. A legacy device or other device detecting L-SIG transmitted by the station may not perform a backoff process between the end of the PPDU and the end of the TXOP. This is because the legacy device or other device is able to determine based on the length and data rate when the end of the TXOP is to occur and can wait until that point in time to transmit.

Figure 12:
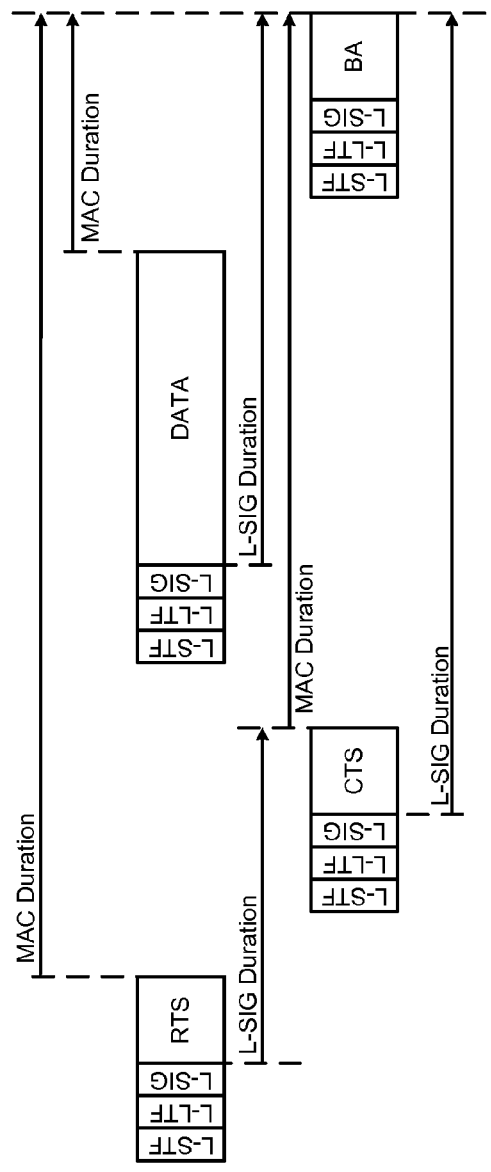
FIG. 12 shows a signal timing diagram illustrating transmit opportunity (TXOP) interference protection for transmitted RTS and CTS messages, data, and a NDP BA.

FIG. 12 shows a signal timing diagram illustrating TXOP interference protection for transmitted RTS and CTS messages, data, and a NDP BA. A RTS message, a CTS message, data (e.g., MPDUs or A-MPDUs), and a NDP BA are shown with corresponding legacy headers. The legacy headers have respective L-STFs, L-LTFs, and L-SIGs. The L-SIGs may indicate remaining durations of a TXOP, which are labeled (i) MAC durations which refer to remaining durations beginning at ends of the RTS, CTS and data, and (ii) L-SIG durations which refer to remaining durations beginning at ends of the L-SIGs of the RTS and CTS. Legacy devices and/or other devices may not transmit during the MAC durations and/or L-SIG durations or portions thereof to avoid interference with the RTS message, the CTS message, the data and the BA.

Figure 13:
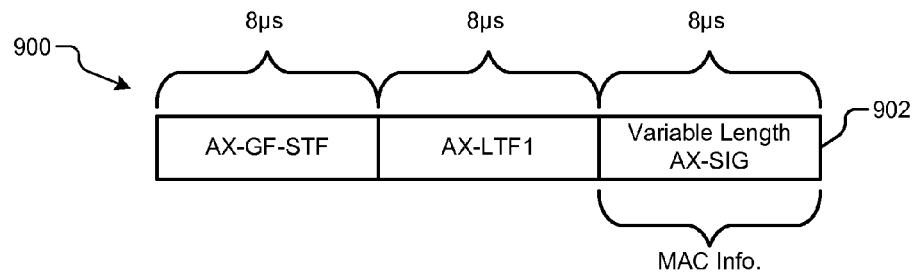
FIG. 13 illustrates a NDP MAC frame for a Greenfield mode in accordance with the present disclosure.

In the following FIGS. 13-15 multiple NDP MAC frames are shown. These frames may be transmitted by, for example, an access point and to stations operating according to IEEE 802.11ax. The NDP MAC frames may be transmitted for example as SYNC frames, ACK frames, NDP BA frames, etc. FIG. 13 illustrates a NDP MAC frame 900 for a Greenfield mode. The NDP MAC frame includes an AX-GF-STF, an AX-LTF1, and an AX-SIG 902. A bit in the AX-SIG may be used to indicate whether the NDP MAC frame 900 is a normal PPDU or a NDP MAC frame. The AX-SIG includes MAC information. The MAC information may include the MAC information disclosed above and/or may include: an OFDM trigger bit or frame, bits indicating which station is to use which channel; bits indicating which station MPDU to acknowledge; a remaining duration of a TXOP of one or more stations; and bits indicating a transmit power of the access point. The AX-SIG 902 has a variable length. The MAC information may include information related to ACKs, NDP BAs, power save (PS)-poll frames, etc. A station may periodically wake from a sleep mode and send a PS-poll frame to an access point. A PS-poll frame may be sent from a station to an access point to determine if the access point has packets (or OFDM symbols) for the station. If the access point does not have packets, then the station may return to a sleep mode. The MAC information may be for each station (i) connected to the access point, and/or (ii) permitted to transmit during a TXOP to the access point. Multiple stations may be permitted to transmit during a single TXOP. The MAC information may include transmission start, end and/or durations and transmission rates for the stations.

The length of the AX-SIG 902 may be adjusted based on the amount and/or type of MAC information included in the AX-SIG. In one embodiment, the AX-SIG has more than two symbols of information. In another embodiment, the MAC information includes 5-10 symbols of information. Although the AX-SIG 902 is shown as being transmitted in 8 micro-seconds (μs), the AX-SIG 902 may have a longer transmission time depending on the length of the AX-SIG.

The transmission times shown are based on a sample transmission speed of 6 mega-bits-per-second (Mbps). The NDP MAC frame 900 may be transmitted at other speeds.

Figure 14:
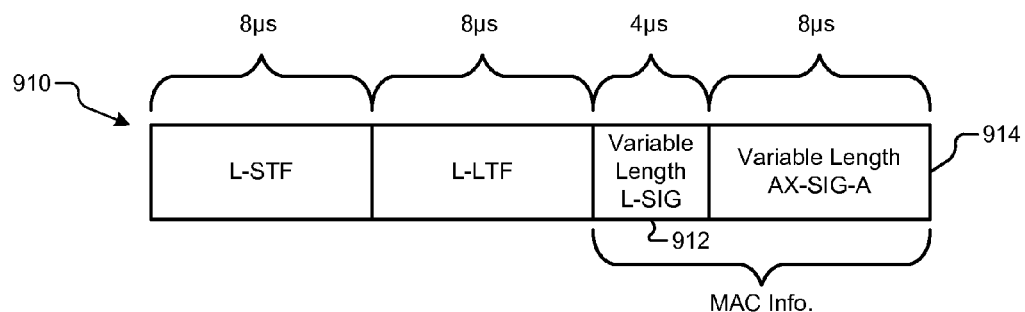
FIG. 14 illustrates a NDP MAC frame for a mixed mode in accordance with the present disclosure.

FIG. 14 illustrates a NDP MAC frame 910 for a mixed mode. The NDP MAC frame 910 includes an L-STF, an L-LTF, an L-SIG 912 and an AX-SIG-A 914. The L-SIG 912 and the AX-SIG-A 914 may each have a variable length based on the amount and/or type of MAC information included in the L-SIG 912 and the AX-SIG-A 914. The L-SIG 912 may indicate a length of a remaining portion of a PPDU that follows the L-SIG (e.g., a length of the AX-SIG-A 914 or a combined length of the AX-SIG-A 914 and additional SIG symbols). The additional SIG symbols may be included in an AX-SIG-B, as shown in FIG. 15, or may be concatenated onto the AX-SIG-A 914. Although not shown in FIG. 14, the NDP MAC frame 910 may include an AX-SIG-B. The AX-SIG-A 914 and the additional symbols (or AX-SIG-B) may each have two or more OFDM symbols. The AX-SIG, AX-SIG-As an AX-SIG-B of FIGS. 13-15 may be referred to as non-legacy signal fields. Non-legacy devices may be able to interpret non-legacy signal fields, whereas legacy devices are not be able to interpret non-legacy signal fields. Non-legacy devices may be devices that conform to IEEE 802.11ax.

The L-SIG may indicate a combined length of the AX-SIG-A and AX-SIG-B. The L-SIG 912 may be configured as not to confuse legacy stations (e.g., stations operating according to IEEE 802.11a, 802.11g, 802.11n, and 802.11ac). The L-SIG 912 may have a fixed length. Although the L-SIG 912 and the AX-SIG-A 914 are shown as being transmitted respectively in 4 µs and 8 µs, the L-SIG 912 and the AX-SIG-A 914 may have longer transmission times depending on the lengths of the L-SIG 912 and the AX-SIG-A 914. The transmission times shown are based on a sample transmission speed of 6 mega-bits-per-second. The NDP MAC frame 910 may be transmitted at other speeds.

Figure 15:
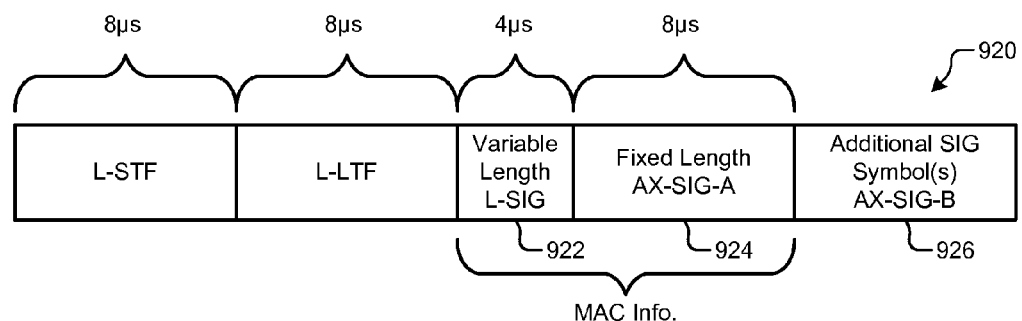
FIG. 15 illustrates a NDP MAC frame for a mixed mode in accordance with the present disclosure.

FIG. 15 illustrates a NDP MAC frame 920 for a mixed mode. The NDP MAC frame 920 includes an L-STF, L-LTF, an L-SIG 922, an AX-SIG-A 924, and an AX-SIG-B 926. The L-SIG 922, AX-SIG-A 924 and AX-SIG-B 926 may have variable lengths. The lengths may be based on the amount and type of MAC information included in the L-SIG 922, AX-SIG-A 924 and AX-SIG-B 926.

Referring now to FIGS. 14 and 15, the L-SIGs 912, 922 may include the length of the remaining part of the PPDU (or NDP MAC frame) and a transmission rate (e.g., 6 Mbps) at which the NDP MAC frame (e.g., one of the NDP MAC frames 900, 910) is transmitted. The length and the rate may be used by a station receiving the NDP MAC frame to determine a remaining duration of a corresponding TXOP. For example, the length divided by the rate provides a duration value. In one embodiment, the transmission rate may be fixed at 6 Mbps while operating in a mixed mode. The AX-SIG-As 914, 924 may include MAC information other than duration fields of remaining TXOPs. The MAC information included in the AX-SIG-As 914, 924 and/or the AX-SIG-B 926 may be compressed prior to transmission of the corresponding NDP MAC frame. Variable lengths of the L-SIGs 912, 922, AX-SIG-As 914, 924 and AX-SIG-B 926 provide flexibility in designing NDP MAC frames.

The L-SIG 912, 922 may also indicate a remaining length of a TXOP for a corresponding NDP MAC frame. This prevents interference by indicating to first stations the TXOP of the access point and/or second stations (legacy or non-legacy stations) permitted to transmit during the TXOP. The first stations are legacy stations and/or stations capable of detecting and interpreting the L-SIG of the transmitted NDP MAC frame. The AX-SIG-A 914, the AX-SIG-A 924 and/or the additional symbols (or AX-SIG-B 926) indicate a length of the corresponding NDP MAC frame. The length may be a determined number of OFDM symbols.

The AX-SIG-A 914, the AX-SIG-A 924 and/or the additional symbols (or AX-SIG-B 926) may be coded at different coding ratings prior to transmission. The AX-SIG-A 914, the AX-SIG-A 924 and/or the additional symbols (or AX-SIG-B 926) may be modulated and coded, while other portions of the corresponding NDP MAC frames 910, 920 (e.g., L-STF, L-LTF, L-SIG) are not modulated and/or coded. The AX-SIG-B 926 may have a higher modulation and/or coding rate than the AX-SIG-A 924.

Figure 16:
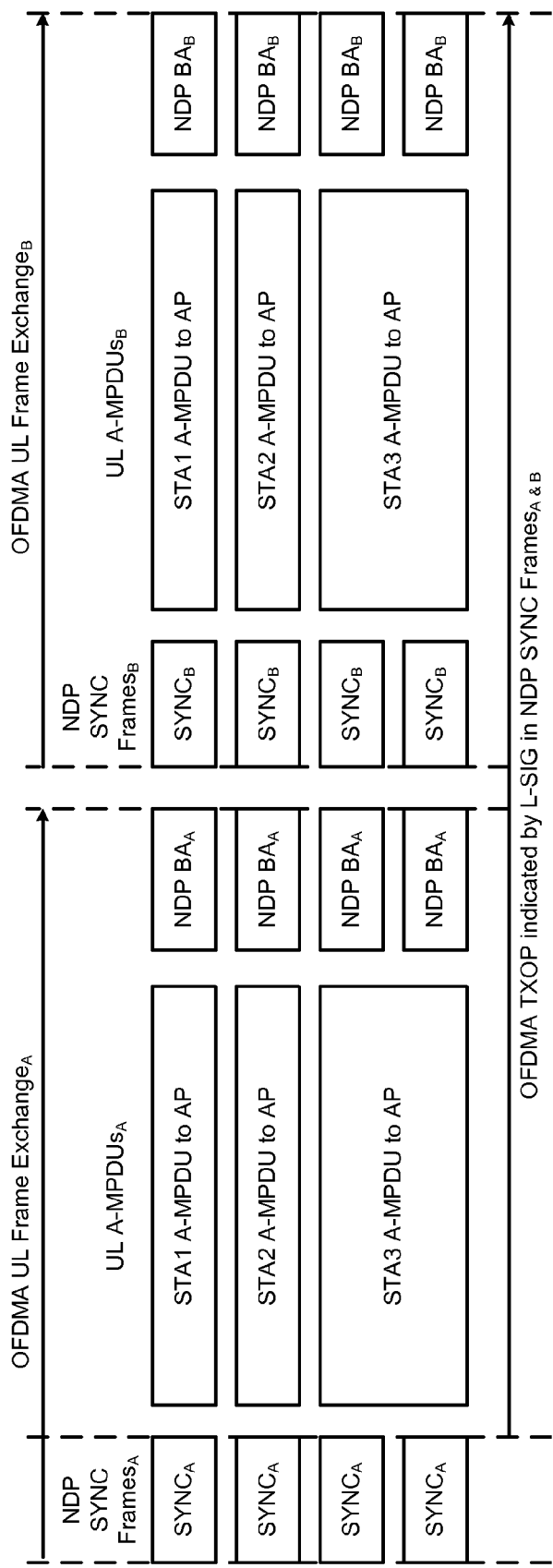
FIG. 16 is a signal timing diagram illustrating an orthogonal frequency division multiple access (OFDMA) frame exchange between an access point and stations in accordance with the present disclosure.
Figures 17, 18:
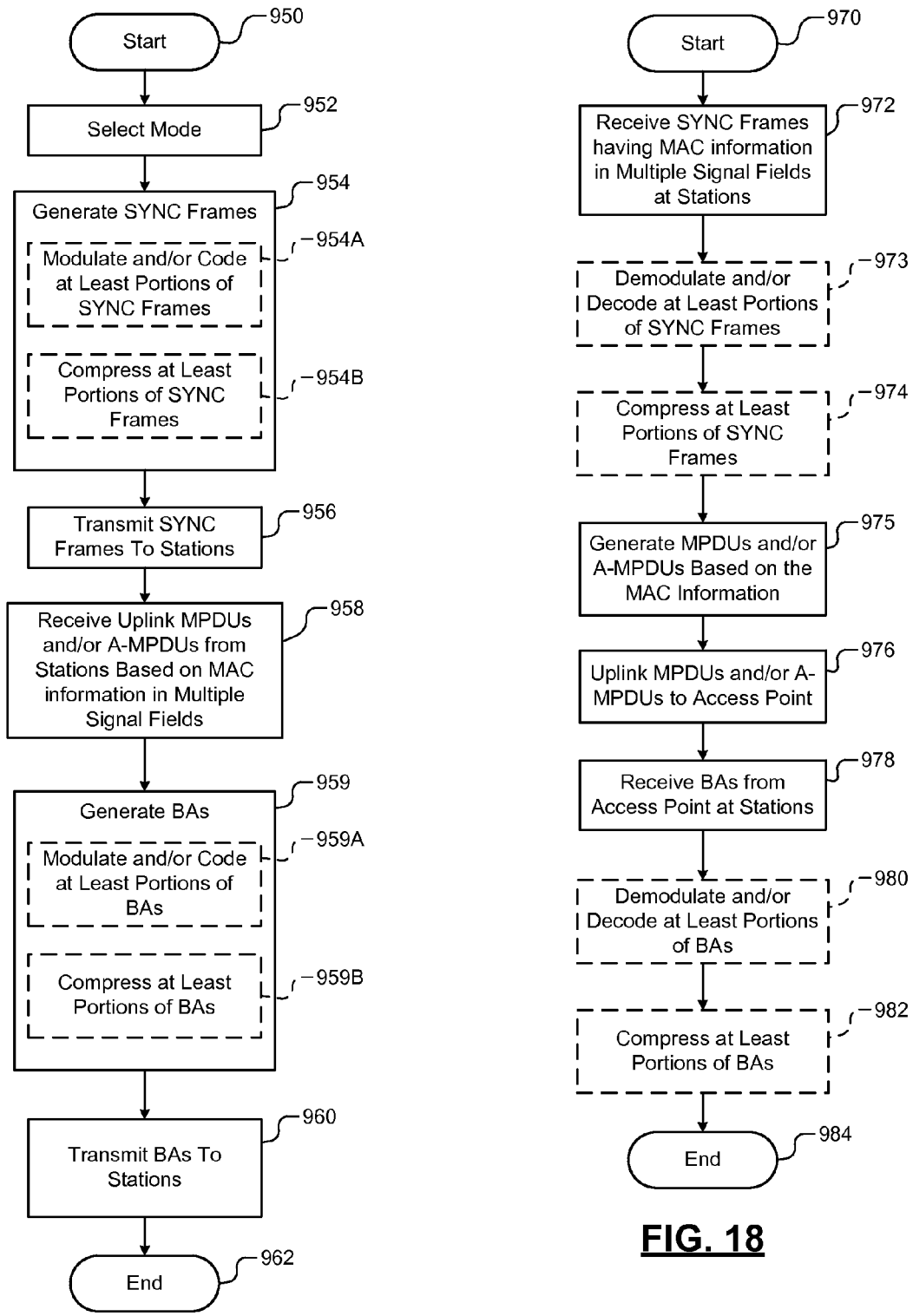
FIG. 17 illustrates an OFDMA exchange method as performed by an access point in accordance with the present disclosure.
FIG. 18 illustrates an OFDMA exchange method as performed by a station in accordance with the present disclosure.

Referring now to FIGS. 16-18, which show a signal timing diagram and corresponding methods for an orthogonal frequency division multiple access (OFDMA) frame exchange between an access point (e.g., one of the access points 104, 800 of FIGS. 1 and 8) and stations (e.g., any of the stations 132 and 802 of FIGS. 1 and 8). The systems disclosed herein may be operated using numerous methods, example methods are illustrated in FIGS. 17-18. The method of FIG. 17 may be performed by an access point. The method of FIG. 18 corresponds to the method of FIG. 17 and may be performed by a station. Although the following tasks are primarily described with respect to the implementations of FIGS. 8 and 16-17, the tasks may be easily modified to apply to other implementations of the present disclosure. The tasks may be iteratively performed.

The method of FIG. 17 may begin at 950. At 952, the mode module 812 selects an operating mode, such as a Greenfield mode, a mixed mode, etc.

At 954, the NDP MAC frame generation module 814 generates SYNC frames 953 in the form of NDP MAC frames (e.g., the NDP MAC frames 902, 910, 920 of FIGS. 13-15). The SYNC frames 953 include signals fields that may comply with IEEE 802.11ax and include MAC information as disclosed herein. At 954A, the coding module 817 may select and/or use a predetermined modulation and coding scheme (MCS) and modulate and/or code at least portions of the SYNC frames (e.g., AX-SIG-As and/or AX-SIG-Bs of the SYNC frames) to generate modulated and coded frames. The MCS of the AX-SIG-Bs may be higher (or greater in value) than the MSC used for the AX-SIG-As. At 954B, the compression module 816 may compress at least portions of the results (or the modulated and coded frames) of task 954A. The compression module 816 may compress portions of the modulated and coded frames corresponding to the AX-SIG-As and/or AX-SIG-Bs. As an alternative, task 954B may be performed prior to task 954A; as a result compressed portions of the SYNC frames (or NDP MAC frames) may be modulated and/or coded.

A SYNC frame may be generated for all stations (e.g., stations STA1-STA3) for which data is to be uplinked to the access point. In FIG. 16, four duplicated SYNC frames 953 are shown for each OFDMA uplink frame exchange shown where each SYNC includes schedule information for all stations. The SYNC is duplicated in OFDMA bandwidth, where each SYNC has 20 MHz width and all SYNC frames for an OFDMA UL frame exchange have the same content. Stations receive the SYNC in primary 20 MHz channel. Stations do not receive the SYNC in OFDMA sub-channels of the stations. At 956, the transceiver 820 of the PHY module 810 transmits the SYNC frames as SYNC signals to the stations. All stations may receive a SYNC frame in a primary channel (e.g., 20 mega-hertz (Mhz) channel). If an OFDMA uplink transmission of MPDUs (or A-MPDU) uses more than the primary channel (e.g., more than 20 MHz), then the SYNC frame may be transmitted on multiple channels (e.g., the primary channel and one or more secondary channels). An example of this is shown in FIG. 16, where the third SYNC frame is transmitted twice on respective channels to the third station STA3. Another possibility is that SYNC in different 20 MHz channel has different content. Each station switches to a 20 MHz channel which includes the station's OFDMA subchannel to receive SYNC frame.

At 958, the access point receives MPDUs and/or A-MPDUs uplinked from the stations based on the SYNC frames, and more particularly, to the MAC information included in the signal fields of the SYNC frames. The MPDUs and/or A-MPDUs of the stations STA1, STA2 may be received on the primary channel. Some and/or portions of the MPDUs and/or A-MPDU of the third station STA3 may be received on the primary channel. Others of the MPDUs and/or A-MPDU of the third station STA3 and/or other portions of the MPDUs and/or A-MPDU of the third station STA3 may be received on the one or more secondary channels.

At 959, in response to receiving the MPDUs and/or A-MPDUs from the stations, the access point via the ACK module 818 generates NDP BAs. At 959A, the coding module 817 may select and/or use a predetermined MCS and modulate and/or code at least portions of the NDP BAs (e.g., AX-SIG-As and/or AX-SIG-Bs of the NDP BAs) to generate modulated and coded frames. The MCS of the AX-SIG-Bs may be higher (or greater in value) than the MSC used for the AX-SIG-As. At 959B, the compression module 816 may compress at least portions of the results (or modulated and coded frames) of task 959A. The compression module 816 may compress portions of the modulated and coded frames corresponding to the AX-SIG-As and/or AX-SIG-Bs. As an alternative, task 959B may be performed prior to task 959A; as a result compressed portions of the NDP BAs (or NDP MAC frames) may be modulated and/or coded.

At 960, the ACK module 818 sends the NDP BAs to the stations. The NDP BAs may be in the form of NDP MAC frames (e.g., any of the NDP MAC frames 902, 910, 920 of FIGS. 13-15) and may comply with IEEE 802.11ax. As shown in FIG. 16, NDP BA includes acknowledge information to all stations and is duplicated in whole OFDMA channel. If an OFDMA uplink transmission of MPDUs (or A-MPDU) uses more than the primary channel (e.g., more than 20 MHz), then multiple duplicated NDP BAs may be transmitted on multiple channels (e.g., the primary channel and one or more secondary channels). The method may end at 962 or may return to task 952 or 954 to transmit additional SYNC frames, MPDUs, and NDP BAs.

Although the following tasks are primarily described with respect to the implementations of FIGS. 8, 16 and 18, the tasks may be easily modified to apply to other implementations of the present disclosure. The tasks may be iteratively performed. In FIG. 16, one of SYNC and BA can also be a normal MAC frame (non-NDP frame).

The method of FIG. 18 may begin at 970. At 972, the stations (e.g., stations STA1, ST2, STA3) receive the SYNC frames via respective transceivers (e.g., the transceiver 842 of the PHY module 834). The SYNC frames may be the SYNC frames generated at 954 of FIG. 17.

At 973, decompression modules of the stations (e.g., the decompression module 838) may decompress at least portions (e.g., non-legacy SIG fields) of the SYNC frames. At 974, decoding modules of the stations (e.g., the decoding module 840) may demodulate and/or decode at least portions (e.g., non-legacy SIG fields) of the SYNC frames. Task 974 may be performed prior to task 973.

At 975, the stations generate MPDUs and/or A-MPDUs. For example, the MPDU generation modules of the stations (e.g., the MPDU generation module 836) generate the MPDUs and/or A-MPDUs based on the SYNC frames. At 976, the transceivers of the stations (e.g., the transceiver 842) transmit the MPDUs and/or A-MPDUs to the access point. The transceivers of the stations may transmit the MPDUs and/or the A-MPDUs during the same period of time. In other words, each station may transmit one or more MPDUs and/or an A-MPDU while the other stations are transmitting MPDUs and/or A-MPDUs.

At 978, the transceivers of the stations receive the NDP BAs from the access point. At 980, decompression modules of the stations (e.g., the decompression module 838) decompress at least portions (e.g., non-legacy SIG fields) of the NDP BAs. At 982, decoding modules of the stations (e.g., the decoding module 840) demodulate and/or decode at least portions (e.g., non-legacy SIG fields) of the NDP BAs. Task 982 may be performed prior to task 980. The method may end at 984.

The above-described tasks of FIGS. 17-18 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, draft IEEE standard 802.11ah, draft IEEE standard 802.11n, and/or draft IEEE standard 802.11ax.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

Further aspects of the present invention relates to one or more of the following clauses. An access point may include a generation module, a transceiver, and an acknowledgment module. The generation module is configured to generate a synchronization signal. The transceiver is configured to (i) transmit the synchronization signal to a station, (ii) receive a medium access control protocol data unit based on the synchronization signal during a transmit opportunity period for the station. The acknowledgment module is configured to generate an acknowledgment signal based on the reception of the medium access control protocol data unit. The synchronization signal or the acknowledgment signal includes a null data packet frame. The null data packet frame includes a legacy signal field. The legacy signal field includes a length of a portion of the null data packet frame subsequent to the legacy signal field. The transceiver is configured to transmit the acknowledgment signal to the station.

The synchronization signal may include the null data packet frame. The null data packet frame may include a non-legacy signal field. The legacy signal field or the non-legacy signal field may indicate a remaining duration of the transmit opportunity period for the station.

The null data packet frame may include a non-legacy signal field. The non-legacy signal field may have a variable length. The variable length may be based on an amount or type of medium access control information in the non-legacy signal field. The null data packet frame may include a non-legacy signal field. The non-legacy signal field may have more than two orthogonal frequency division multiplexing symbols.

The null data packet frame may include a first non-legacy signal field and a second non-legacy signal field. The first non-legacy signal field may indicate a length of the second non-legacy signal field.

The access point may include a coding module, where: the null data packet frame includes a first non-legacy signal field and a second non-legacy signal field; and the coding module is configured to modulate and code the first non-legacy signal field with a different modulation and coding scheme then that used for the second non-legacy signal field.

The access point may include a compression module, where: the null data packet frame includes a non-legacy signal field; and the compression module is configured to compress the non-legacy signal field. The null data packet frame may include a non-legacy signal field. The non-legacy signal field may indicate a length of the null data packet frame.

A station may include a transceiver and a generation module. The transceiver is configured to receive a synchronization signal from an access point. The generation module is configured to generate a medium access control protocol data unit based on the synchronization signal. The transceiver is configured to (i) transmit the medium access control protocol data unit to the access point, and (ii) receive an acknowledgment signal based on the transmission of the medium access control protocol data unit. The synchronization signal or the acknowledgment signal includes a null data packet frame. The null data packet frame includes a legacy signal field. The legacy signal field includes a length of a portion of the null data packet frame subsequent to the legacy signal field.

The synchronization signal may include the null data packet frame. The transceiver may be configured to transmit the medium access control protocol data unit during a transmit opportunity period of the station. The null data packet frame may include a non-legacy signal field. The legacy signal field or the non-legacy signal field may indicate a remaining duration of the transmit opportunity period for the station.

The null data packet frame may include a non-legacy signal field. The non-legacy signal field may have a variable length. The variable length may be based on an amount or type of medium access control information in the non-legacy signal field.

The null data packet frame may include a non-legacy signal field. The non-legacy signal field may have more than two orthogonal frequency division multiplexing symbols. The null data packet frame may include a first non-legacy signal field and a second non-legacy signal field. The first non-legacy signal field may indicate a length of the second non-legacy signal field.

The station may further include a coding module. The null data packet frame may include a first non-legacy signal field and a second non-legacy signal field. The coding module may be configured to modulate and code the first non-legacy signal field with a different modulation and coding scheme then that used for the second non-legacy signal field.

The station may further include a compression module. The null data packet frame may include a non-legacy signal field. The compression module may be configured to compress the non-legacy signal field. The null data packet frame may include a non-legacy signal field. The non-legacy signal field may indicate a length of the null data packet frame.

A method of operating an access point is disclosed. The method may include: generate synchronization signal; transmitting via a transceiver the synchronization signal to a station; receiving a medium access control protocol data unit based on the synchronization signal during a transmit opportunity period for the station; and generating an acknowledgment signal based on the reception of the medium access control protocol data unit. The synchronization signal or the acknowledgment signal includes a null data packet frame. The null data packet frame includes a legacy signal field. The legacy signal field includes a length of a portion of the null data packet frame subsequent to the legacy signal field. The method further includes transmitting via the transceiver the acknowledgment signal to the station.

The synchronization signal may include the null data packet frame. The null data packet frame may include a non-legacy signal field. The legacy signal field or the non-legacy signal field may indicate a remaining duration of the transmit opportunity period for the station.

The null data packet frame may include a non-legacy signal field. The non-legacy signal field may have more than two orthogonal frequency division multiplexing symbols. The null data packet frame may include a first non-legacy signal field and a second non-legacy signal field. The first non-legacy signal field may indicate (i) a length of the second non-legacy signal field, and (ii) a length of the null data packet frame.

The method may further include: modulating and coding a first non-legacy signal field with a different modulation and coding scheme then that used for a second non-legacy signal field, where the null data packet frame includes the first non-legacy signal field and the second non-legacy signal field; and compressing the first non-legacy signal field or the second non-legacy signal field.

A method of operating a station is also disclosed. The method includes: receiving via a transceiver a synchronization signal from an access point; generating a medium access control protocol data unit based on the synchronization signal; transmitting via the transceiver the medium access control protocol data unit to the access point; and receiving via the transceiver an acknowledgment signal based on the transmission of the medium access control protocol data unit. The synchronization signal or the acknowledgment signal includes a null data packet frame. The null data packet frame includes a legacy signal field. The legacy signal field includes a length of a portion of the null data packet frame subsequent to the legacy signal field. The synchronization signal may include the null data packet frame.

The method may further include transmitting via the transceiver the medium access control protocol data unit during a transmit opportunity period of the station. The null data packet frame may further include a non-legacy signal field. The legacy signal field or the non-legacy signal field may indicate a remaining duration of the transmit opportunity period for the station.

The null data packet frame may include a non-legacy signal field. The non-legacy signal field may have more than two orthogonal frequency division multiplexing symbols. The null data packet frame may include a first non-legacy signal field and a second non-legacy signal field. The first non-legacy signal field may indicate (i) length of the second non-legacy signal field, and (ii) a length of the null data packet frame.

The method may further include: modulating and coding a first non-legacy signal field with a different modulation and coding scheme then that used for a second non-legacy signal field, where the null data packet frame includes the first non-legacy signal field and the second non-legacy signal field; and compressing the first non-legacy signal field or the second non-legacy signal field.

What is claimed is:

1. An access point comprising:
   a generation circuit configured to generate a synchronization signal;
   a transceiver configured to (i) transmit the synchronization signal to a station, and (ii) receive a medium access control protocol data unit based on the synchronization signal during a transmit opportunity period for the station; and
   an acknowledgment circuit configured to generate an acknowledgment signal based on the reception of the medium access control protocol data unit, wherein the synchronization signal or the acknowledgment signal includes a null data packet frame, wherein the null data packet frame comprises a legacy signal field and a non-legacy signal field, wherein the legacy signal field comprises a length of a portion of the null data packet frame subsequent to the legacy signal field, wherein the legacy signal field or the non-legacy signal field indicates a remaining duration of the transmit opportunity period for the station, and
   wherein the transceiver is configured to transmit the acknowledgment signal to the station.

2. The access point of claim 1, wherein the synchronization signal comprises the null data packet frame.

3. The access point of claim 1, wherein the non-legacy signal field has more than two orthogonal frequency division multiplexing symbols.

4. The access point of claim 1, further comprising a compression circuit, wherein the compression circuit is configured to compress the non-legacy signal field.

5. The access point of claim 1, wherein the non-legacy signal field indicates a length of the null data packet frame.

6. An access point comprising:
a generation circuit configured to generate a synchronization signal;
a transceiver configured to (i) transmit the synchronization signal to a station, and (ii) receive a medium access control protocol data unit based on the synchronization signal during a transmit opportunity period for the station; and
an acknowledgment circuit configured to generate an acknowledgment signal based on the reception of the medium access control protocol data unit, wherein the synchronization signal or the acknowledgment signal includes a null data packet frame, wherein the null data packet frame comprises a legacy signal field and a non-legacy signal field, wherein the legacy signal field comprises a length of a portion of the null data packet frame subsequent to the legacy signal field, wherein the non-legacy signal field has a variable length, and wherein the variable length is based on an amount or type of medium access control information in the non-legacy signal field, and
wherein the transceiver is configured to transmit the acknowledgment signal to the station.

7. An access point comprising:
a generation circuit configured to generate a synchronization signal;
a transceiver configured to (i) transmit the synchronization signal to a station, and (ii) receive a medium access control protocol data unit based on the synchronization signal during a transmit opportunity period for the station; and
an acknowledgment circuit configured to generate an acknowledgment signal based on the reception of the medium access control protocol data unit, wherein the synchronization signal or the acknowledgment signal includes a null data packet frame, wherein the null data packet frame comprises a legacy signal field, wherein the legacy signal field comprises a length of a portion of the null data packet frame subsequent to the legacy signal field, wherein the null data packet frame further comprises a first non-legacy signal field and a second non-legacy signal field, wherein the first non-legacy signal field indicates a length of the second non-legacy signal field, and
wherein the transceiver is configured to transmit the acknowledgment signal to the station.

8. An access point comprising:
a generation circuit configured to generate a synchronization signal;
a transceiver configured to (i) transmit the synchronization signal to a station, and (ii) receive a medium access control protocol data unit based on the synchronization signal during a transmit opportunity period for the station; and
an acknowledgment circuit configured to generate an acknowledgment signal based on the reception of the medium access control protocol data unit, wherein the synchronization signal or the acknowledgment signal includes a null data packet frame, wherein the null data packet frame comprises a legacy signal field, wherein the legacy signal field comprises a length of a portion of the null data packet frame subsequent to the legacy signal field, and wherein the null data packet frame further comprises a first non-legacy signal field and a second non-legacy signal field; and
a coding circuit configured to modulate and code the first non-legacy signal field with a different modulation and coding scheme than that used for the second non-legacy signal field.

9. The access point of claim 8, further comprising a medium access control circuit comprising the generation circuit, the acknowledgement circuit and the coding circuit.

10. The access point of claim 8, further comprising a medium access control circuit comprising the generation circuit, the acknowledgement circuit and the coding circuit.

11. A station comprising:
a transceiver configured to receive a synchronization signal from an access point; and
a generation circuit configured to generate a medium access control protocol data unit based on the synchronization signal,
wherein the transceiver is configured to (i) transmit the medium access control protocol data unit to the access point during a transmit opportunity period of the station, and (ii) receive an acknowledgment signal based on the transmission of the medium access control protocol data unit, wherein the synchronization signal or the acknowledgment signal comprises a null data packet frame, wherein the null data packet frame comprises a legacy signal field and a first non-legacy signal field, wherein the legacy signal field or the first non-legacy signal field indicates a remaining duration of the transmit opportunity period for the station, and wherein the legacy signal field comprises a length of a portion of the null data packet frame subsequent to the legacy signal field.

12. The station of claim 11, wherein the synchronization signal comprises the null data packet frame.

13. The station of claim 11, wherein:
the first non-legacy signal field has a variable length; and
the variable length is based on an amount or type of medium access control information in the non-legacy signal field.

14. The station of claim 11, wherein the first non-legacy signal field has more than two orthogonal frequency division multiplexing symbols.

15. The station of claim 11, wherein:
the null data packet frame comprises a second non-legacy signal field; and
the first non-legacy signal field indicates a length of the second non-legacy signal field.

16. The station of claim 11, further comprising a coding circuit, wherein:
the null data packet frame comprises a second non-legacy signal field; and
the coding circuit is configured to modulate and code the first non-legacy signal field with a different modulation and coding scheme than that used for the second non-legacy signal field.

17. The station of claim 16, further comprising a medium access control circuit comprising the generation circuit and the coding circuit.

18. The station of claim 11, further comprising a compression circuit, wherein the compression circuit is configured to compress the first non-legacy signal field.

19. The station of claim 18, further comprising a medium access control circuit comprising the generation circuit and the compression circuit.

20. The station of claim 11, wherein the first non-legacy signal field indicates a length of the null data packet frame.

21. A method of operating an access point, the method comprising:
generate synchronization signal;
transmitting via a transceiver the synchronization signal to a station;
receiving a medium access control protocol data unit based on the synchronization signal during a transmit opportunity period for the station;
generating an acknowledgment signal based on the reception of the medium access control protocol data unit, wherein the synchronization signal or the acknowledgment signal includes a null data packet frame, wherein the null data packet frame comprises a legacy signal field and a first non-legacy signal field, wherein the legacy signal field comprises a length of a portion of the null data packet frame subsequent to the legacy signal field, and wherein the first non-legacy signal field has more than two orthogonal frequency division multiplexing symbols; and
transmitting via the transceiver the acknowledgment signal to the station.

22. The method of claim 21, wherein the synchronization signal comprises the null data packet frame.

23. The method of claim 21, wherein the legacy signal field or the first non-legacy signal field indicates a remaining duration of the transmit opportunity period for the station.

24. The method of claim 21, wherein:
the null data packet frame comprises a second non-legacy signal field; and
the first non-legacy signal field indicates (i) a length of the second non-legacy signal field, and (ii) a length of the null data packet frame.

25. The method of claim 21, further comprising:
modulating and coding the first non-legacy signal field with a different modulation and coding scheme than that used for a second non-legacy signal field, wherein the null data packet frame comprises the second non-legacy signal field; and
compressing the first non-legacy signal field or the second non-legacy signal field.

26. A method of operating a station, the method comprising:
receiving via a transceiver a synchronization signal from an access point;
generating a medium access control protocol data unit based on the synchronization signal;
transmitting via the transceiver the medium access control protocol data unit to the access point; and
receiving via the transceiver an acknowledgment signal based on the transmission of the medium access control protocol data unit,
wherein the synchronization signal or the acknowledgment signal comprises a null data packet frame, wherein the null data packet frame comprises a legacy signal field and a first non-legacy signal field, wherein the legacy signal field comprises a length of a portion of the null data packet frame subsequent to the legacy signal field, and wherein the non-legacy signal field has more than two orthogonal frequency division multiplexing symbols.

27. The method of claim 26, wherein the synchronization signal comprises the null data packet frame.

28. The method of claim 26, further comprising transmitting via the transceiver the medium access control protocol data unit during a transmit opportunity period of the station, wherein the legacy signal field or the first non-legacy signal field indicates a remaining duration of the transmit opportunity period for the station.

29. The method of claim 26, wherein:
the null data packet frame comprises a second non-legacy signal field; and
the first non-legacy signal field indicates (i) length of the second non-legacy signal field, and (ii) a length of the null data packet frame.

30. The method of claim 26, further comprising:
modulating and coding the first non-legacy signal field with a different modulation and coding scheme than that used for a second non-legacy signal field, wherein the null data packet frame comprises the second non-legacy signal field; and
compressing the first non-legacy signal field or the second non-legacy signal field.

31. An access point comprising:
a processor;
a memory configured to more software including instructions, which are executable by the processor and are configured to generate a synchronization signal; and
a transceiver configured to (i) transmit the synchronization signal to a station, (ii) receive a medium access control protocol data unit based on the synchronization signal during a transmit opportunity period for the station,
wherein the instructions are further configured to generate an acknowledgment signal based on the reception of the medium access control protocol data unit, wherein the synchronization signal or the acknowledgment signal includes a null data packet frame, wherein the null data packet frame comprises a legacy signal field, wherein the legacy signal field comprises a length of a remaining portion of a physical layer convergence protocol (PLCP) protocol data unit (PPDU) that is subsequent to the legacy signal field of the null data packet frame, and
wherein the transceiver is configured to transmit the acknowledgment signal to the station.

* * * * *